United States Patent
Simmons

(10) Patent No.: US 12,461,397 B2
(45) Date of Patent: Nov. 4, 2025

(54) SYSTEMS, DEVICES, ARTICLES, AND METHODS TO DIRECT OPTICAL SIGNALS USING LUMINESCENT DEFECTS IN SEMICONDUCTOR MATERIAL

(71) Applicant: PHOTONIC INC., Coquitlam (CA)

(72) Inventor: Stephanie Simmons, Burnaby (CA)

(73) Assignee: PHOTONIC INC., Coquitlam (CA)

( * ) Notice: Subject to any disclaimer, the term of this patent is extended or adjusted under 35 U.S.C. 154(b) by 687 days.

(21) Appl. No.: 17/753,909

(22) PCT Filed: Sep. 18, 2020

(86) PCT No.: PCT/CA2020/051259
§ 371 (c)(1),
(2) Date: Mar. 17, 2022

(87) PCT Pub. No.: WO2021/051206
PCT Pub. Date: Mar. 25, 2021

(65) Prior Publication Data
US 2022/0382082 A1    Dec. 1, 2022

Related U.S. Application Data

(60) Provisional application No. 62/903,306, filed on Sep. 20, 2019.

(51) Int. Cl.
*G02F 1/025* (2006.01)
*G02F 1/21* (2006.01)
(Continued)

(52) U.S. Cl.
CPC ............ *G02F 1/025* (2013.01); *G02F 1/21* (2013.01); *G02F 1/311* (2021.01); *H04B 10/70* (2013.01)

(58) Field of Classification Search
CPC ......... H04B 10/70; G06N 10/00; G02F 1/311; G02F 1/21; G02F 1/025
(Continued)

(56) References Cited

U.S. PATENT DOCUMENTS 3,434,894 A    3/1969    Gale
2007/0280592 A1    12/2007    Furyua et al.
(Continued)

OTHER PUBLICATIONS

Yan, C.-H. et al., "Controlling single-photon transport with three-level quantum dots in photonic crystals", Physical Review A, Mar. 11, 2014, vol. 89, No. 3.
(Continued)

*Primary Examiner* — Jacob Y Choi
*Assistant Examiner* — Ashley Nicole Blackwell
(74) *Attorney, Agent, or Firm* — Oyen Wiggs Green & Mutala LLP

(57) ABSTRACT

Information processing systems, devices, articles and methods are configured for receiving a first photon at a first switch including a first region of semiconductor material, and a first local defect disposed in the first region of semiconductor material. The first local defect has a first defect computational state. Based on, at least, the first defect computational state of the first local defect, a second photon is directed to travel by a first output path communicatively coupled to the first local defect, or a second output path communicatively coupled to the first local defect.

16 Claims, 12 Drawing Sheets

(51) Int. Cl.
   *G02F 1/31*      (2006.01)
   *H04B 10/70*     (2013.01)
(58) Field of Classification Search
   USPC .......................................................... 257/421
   See application file for complete search history.

(56) References Cited

U.S. PATENT DOCUMENTS

| | | |
|---|---|---|
| 2008/0063339 A1 | 3/2008 | Spillane et al. |
| 2013/0107253 A1* | 5/2013 | Santori .................. G01N 21/65 356/301 |
| 2013/0107352 A1 | 5/2013 | Santori et al. |
| 2018/0114138 A1 | 4/2018 | Monroe et al. |
| 2018/0330266 A1* | 11/2018 | Simmons ............. G02B 6/1225 |

OTHER PUBLICATIONS

Yan, C.-H. et al., "Quantum optical switches and beam splitters with surface plasmons", Journal of Applied Physics, AIP Publishing Sep. 1, 2012, vol. 112, No. 5.

Chang, D.E. et al., "A single-photon transistor using nano-scale surface plasmons", arXiv.org, Jun. 28, 2007, [online], pp. 1-20, URL: https://www.arxiv.org/pdf/0706.4335.

Aharonovich, I. et al., "Solid-state single-photon emitters", Nature Photonics, vol. 10, p. 631-641, 2016.

Chu, S. T. et al. "An Eight-Channel Add-Drop Filter Using Vertically Coupled Microring Resonators Over a Cross Grid", IEEE Photonics Technology Letters, vol. 11, No. 6, pp. 691-693, Jun. 1999.

Coles, R. J. et al., "Waveguide-coupled photonic crystal cavity for quantum dot spin readout", Opt. Express 22(3), 2376-2385, 2014.

Elshaari, A. W. et al., "On-chip single photon filtering and multiplexing in hybrid quantum photonic circuits", Nature Communications 8:379, p. 1-8, 2017.

Aharonovich, I. et al., "Diamond Nanophotonics", Advanced Optical Materials, vol. 2, No. 10, p. 911-928, Jul. 30, 2014.

Bermel, P. et al., "Single-photon all-optical switching using waveguide-cavity quantum electrodynamics", Phys. Rev. A, vol. 74, 043818, Oct. 24, 2006.

Morse, K. J. et al., "A photonic platform for donor spin qubits in silicon", Sci. Adv. 2017, 3, Jul. 26, 2017.

Akhlaghi, M. K. et al., "Waveguide integrated superconducting single-photon detectors implemented as near-perfect absorbers of coherent radiation", Nature Communications 6: 8233 (2015).

Eisaman, M. D. et al., "Single-photon sources and detectors", Rev. Sci. Instrum. 82, 071101 (2011).

Davies, G., "The Optical Properties of Luminescence Centres in Silicon", Physics Reports 176: 83-188 (1989).

* cited by examiner

SYSTEMS, DEVICES, ARTICLES, AND METHODS TO DIRECT OPTICAL SIGNALS USING LUMINESCENT DEFECTS IN SEMICONDUCTOR MATERIAL

CROSS-REFERENCE TO RELATED APPLICATIONS

This application claims the benefit under 35 U.S.C. § 119 of U.S. application No. 62/903,306 filed 20 Sep. 2019 and entitled SYSTEMS, DEVICES, ARTICLES, AND METHODS TO DIRECT OPTICAL SIGNALS USING LUMINESCENT DEFECTS IN SEMICONDUCTOR MATERIAL which is hereby incorporated herein by reference for all purposes.

FIELD

This disclosure generally relates to communication networks and information processors and more particularly to systems, devices, articles, and methods for directing signals based on states of local defects in bodies of semiconductor material, e.g., luminescent defects in purified silicon.

BACKGROUND

Information is contained in the state of a physical system. The physical system may be a quantum system or a classical system. Systems include tangible devices such as electrical components defined on or within one or more substrates. The physical system may include one or more photons that may interact with or otherwise communicatively couple other physical components. The one or more photons may emanate from a tangible photon source, travel by a communication channel, interact with an information processing device, and be measured by a detector.

SUMMARY

The present disclosure has various aspects that include:
 methods for selectively switching photons between output paths;
 apparatus (e.g. switches and networks of switches for selectively switching photons between output paths.
 methods and apparatus for providing superpositions of photon states.

One aspect of the disclosure provides information processing device including a region of semiconductor material, and a local defect disposed in the first region of semiconductor material. The local defect supports a computational state selected from a first state, a second state, or a first superposition of the first state and the second state. The device also includes a first input waveguide communicatively coupled to the local defect, and a first output waveguide communicatively coupled to the local defect. The first output waveguide supports a first output path, and a photon emanating from the local defect is directed into the first output waveguide and the first output path dependent on, at least, the computational state of the local defect.

Another aspect of the disclosure describes information processing methods that include receiving a first photon at a first switch including a first region of semiconductor material, and a first local defect disposed in the first region of semiconductor material. The first local defect has a first defect computational state. The method further including, based on, at least, the first defect computational state of the first local defect, directing a second photon to travel by a first output path communicatively coupled to the first local defect, or a second output path communicatively coupled to the first local defect.

Another aspect of the disclosure describes information processing methods that include preparing a local defect disposed in a body of semiconductor material in a defect computational state. The defect computational state is selected from a first defect basis state, a second defect basis state, or a superposition of the first defect basis state and the second defect basis state. The method further including, based on at least the defect computational state of the local defect, directing an output photon to travel by a first output path communicatively coupled to the local defect, or a second output path communicatively coupled to the local defect.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

This disclosure discusses systems, devices, articles, and methods with practical application in information processing (e.g., computing, communication, quantum computing, and quantum communication). Information processing includes processing information where information is stored in the physical state of a physical (e.g., tangible) system. Quantum information processing includes processing information by using one or more quantum physical effects, such as, superposition, coherence, decoherence, entanglement, nonlocality, and teleportation.

Communication includes transferring classical or quantum information from one physical system to another physical system by one or more signals which describe the physical state of a physical system. Quantum communication includes processing information by using one or more quantum physical effects or processes, such as, superposition, coherence, entanglement, nonlocality, teleportation, and measurement.

Communication can be used in computing. For example, the systems, devices, articles, and methods, described herein can use the state of moving information (e.g., a photon) to influence the states in stationary information (e.g., a defect in a semiconductor body), or the reverse. One or both of the stationary information or the moving information may be classical information.

Figure 1:
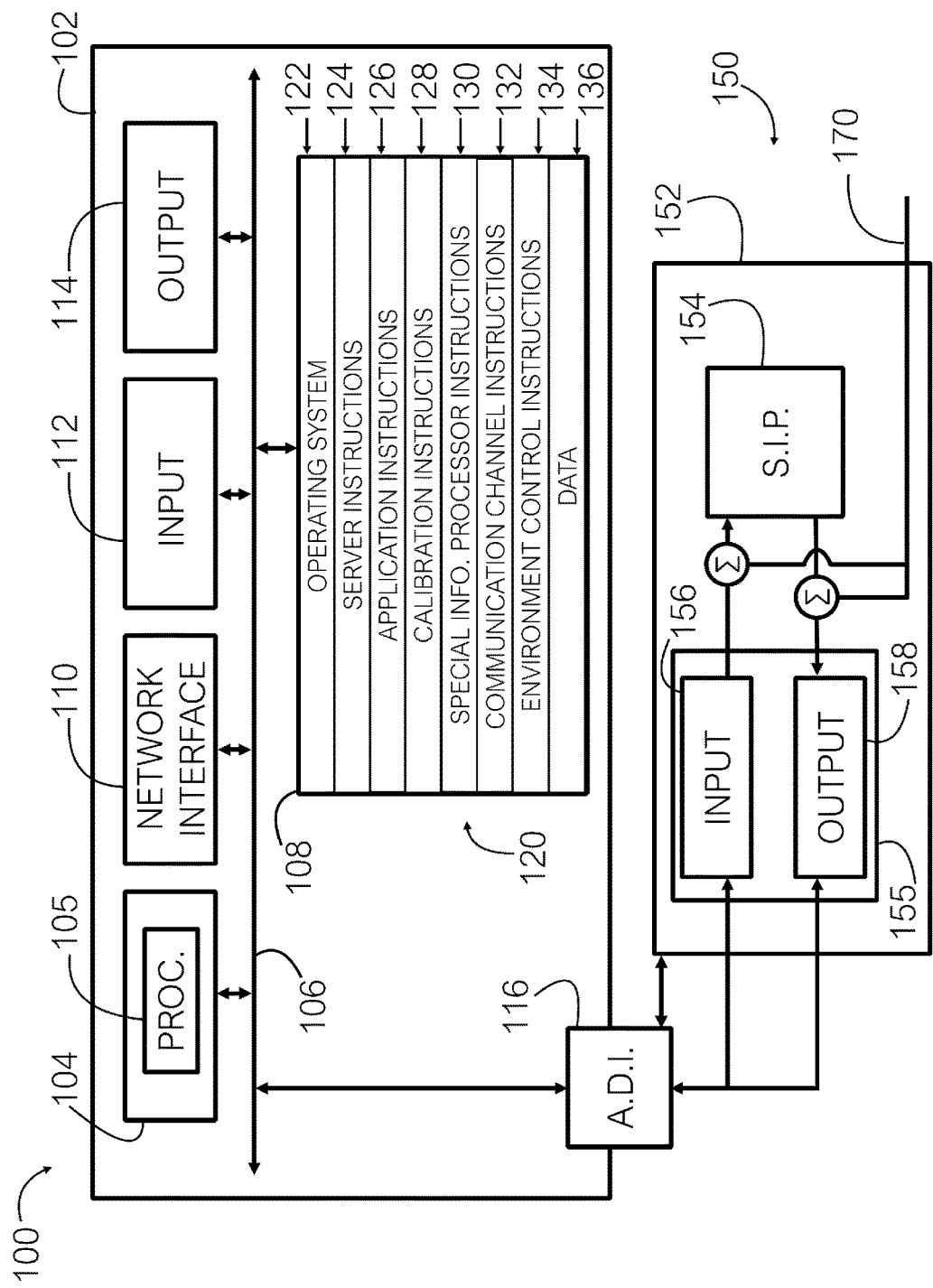
FIG. 1 is a schematic diagram illustrating a portion of a system including a processor-based device communicatively coupled to a special information processor.

FIG. 1 illustrates a processor-based system 100 including one or more specialized devices to process information. System 100 includes a digital computer 102 that comprises a control subsystem 104. Control subsystem 104 includes at least one processor 105. Digital computer 102 includes at least one bus 106 coupled to control subsystem 104. System 100 further includes at least one non-transitory computer- and processor-readable storage device 108, and a network interface subsystem 110, both communicatively coupled to bus(es) 106. Digital computer 102 includes an operator input subsystem 112, and an operator output subsystem 114, communicatively coupled to the bus(es) 106. Digital computer 102 also includes an analog device interface (ADI) subsystem 116 coupled to bus(es) 106. Bus(es) 106 may communicatively couple two or more subsystems in computer 102. In some implementations, some subsystems of system 100 may be omitted or combined. Some subsystem of system 100 may be remotely accessed via network interface subsystem 110.

The at least one processor 105 may be any logic processing unit, such as one or more digital processors, microprocessors, central processing units (CPUs), graphics processing units (GPUs), application-specific integrated circuits (ASICs), programmable gate arrays (PGAs), programmed logic units (PLUs), digital signal processors (DSPs), network processors (NPs), and the like. The at least one processor 105 may include analog capacity such as found in a DSP, GPU, analog-to-digital converter, or digital-to-analog converter.

Network interface subsystem 110 includes communication circuitry to support bidirectional communication of processor-readable data, and processor-executable instructions. Network interface subsystem 110 may employ communication protocols (e.g., FTP, HTTPS, SSH, TCP/IP, SOAP plus XML) to exchange processor-readable data, and processor-executable instructions over a network or non-network communication channel (not shown) such as, Internet, a serial connection, a parallel connection, ETHERNET®, wireless connection, fiber optic connection, combinations of the preceding, and the like.

Operator input subsystem 112 includes one or more user interface devices such as keyboard, pointer, number pad, touch screen, or other interface devices for a user or human operator.

In some implementations, operator input subsystem 112 includes one or more sensors for digital computer 102 or analog device 150. The one or more sensors provide information characterizing or representing the environment or internal state of digital computer 102 and/or analog device 150. Further, output subsystem 114 includes one or user interface devices such as, display, lights, speaker, and printer.

Storage device(s) 108 include at least one nontransitory or tangible storage device. Storage device(s) 108 can, for example, include one or more volatile storage devices, for instance random access memory (RAM); and one or more non-volatile storage devices, for instance read only memory (ROM). The storage device(s) 108 may comprise solid state memory, flash memory, magnetic hard disk, optical disk, solid state disk (SSD), hard disk drive (HDD), network drive, other forms of computer- and processor-readable storage media, or a combination. A person of ordinary skill in the art will appreciate storage device(s) 108 and may be implemented in a variety of ways, such as, non-volatile storage, volatile storage, and/or a combination thereof. Further, computer systems can conflate volatile storage and non-volatile storage, for example, caches, solid-state hard drives, in-memory databases, and the like.

Storage device(s) 108 includes or stores processor-executable instructions and/or processor-readable data 120 associated with the operation of system 100. Executing processor-executable instructions 120, and, optionally, reading processor-readable data 120 causes the at least one processor 105, and/or control subsystem 104, to carry out, or cause, various methods and actions to be performed by system 100, digital computer 102, other systems or devices, or a combination. For example, through network interface subsystem 110, or ADI subsystem 116. Processor-executable instructions and/or processor-readable data 120 can, for example, include a basic input/output system (BIOS) (not shown), an operating system 122, peripheral drivers (not shown), server instructions 124, application instructions 126, calibration instructions 128, special information processor instructions 130, communication channel instructions 132, environment instructions 134, and data 136. A portion of storage device(s) 108, or processor-executable instructions and/or processor-readable data 120 may be included in an article of manufacture comprising a non-transitory processor readable storage device.

Exemplary operating system 122 includes, for example, LINUX®, and WINDOWS® operating systems. Server instructions 124 include processor-executable instructions and/or processor-readable data to interact with processor-based devices external to system 100 across a network through network interface subsystem 110. In some implementations, processor-executable server instructions 124 include processor-executable instructions and/or processor-readable data that, when executed by a processor, schedules jobs for digital computer 102 or analog device 150. Application instructions 126 include processor-executable instructions that, when executed, cause system 100 to perform one or more actions associated with an application, e.g., perform computations on digital computer 102 and/or analog device 150.

Calibration instructions 128 include processor-executable instructions, that, when executed by a processor (e.g., processor(s) 105) cause the processor to calibrate analog device 150 to obtain calibrated values and to store the calibrated values for analog device 150. Calibration may compensate for variations in components of analog device 150. Components included in or on analog device 150 could have inter-component variation in operating parameters. Variation in operating parameters may vary with time or vary from expected or ideal component parameters. Calibration instructions 128, when executed by a processor, allow for test and correction of these inter-component variation, temporal variation, and/or variation from expected or ideal component parameters.

Special information processor instructions 130 include processor-executable instructions that, when executed by a processor (e.g., processor(s) 105), cause the processor to control, initialize, write to, manipulate, read out, and/or otherwise send data to/from analog device 150. Special information processor instructions 130 may implement, in part, the methods described herein (e.g., with reference to FIGS. 7-9) and/or make use of control subsystem(s) included in analog device 150.

Communication channel instructions 132 include processor-executable instructions that, when executed by a processor (e.g., processor(s) 105), cause the processor to initialize, control, read out, information in a communication channel or associated devices like source or readout device. Communication channel instructions 132 may implement, in part, the methods described herein (e.g., with reference to FIGS. 7-9).

Environment instructions 134 include processor-executable instructions and/or processor-readable data, that, when executed by a processor (e.g., processor(s) 105), cause the processor to control and monitor aspects of prescribed and possibly specialized environments for part or all of analog device 150. Examples of environment instructions 134 include instructions which when executed monitor and control temperature and magnetic field affecting a special information processor 154 of analog device 150. Environment instructions 134 could create a thermal profile (e.g., temperature values for some or all of analog device 150 with temporal or spatial dependencies). Environment instructions 134 may implement, in part, the methods described herein Data 136 may include processor-readable information or data used, obtained, created, or updated by the operation of system 100. For example, data may include one or more logs from digital computer 102 and analog device 150. Data 136 may include processor-readable data comprising parameters for the operation of system 100. Data 136 may include processor-readable data associated with (e.g., created by, referred to, changed by) a processor executing processor-executable instructions, such as, server instructions 124, application instructions 126, calibration instructions 128, special information processor instructions 130, and environment instructions 134. Data 136 may include processor-readable data corresponding to energy states (e.g. local degrees of freedom) associated with luminescent defects, or transitions (e.g. energy differences) between such states. Data 136 may include processor readable information recording the state of photons or defects.

Analog device interface (ADI) subsystem 116 includes communication circuitry that supports bidirectional communication between digital computer 102 and analog device 150. In some implementations, the input or output from analog device 150 is digital and an intermediate state within analog computer is analog. In some implementations, ADI subsystem 116 interacts with an environment subsystem 152 of analog device 150. In some implementations, ADI subsystem 116 interacts with special information processor 154 through one or more subsystems of analog device 150 (e.g., subsystems 156 and 158). In various implementations, ADI subsystem 116 may include a waveform digitizer (e.g., an ALAZARTECH ATS9440, a 4-channel, 14 bit, 125 MS/s card, or an ALAZARTECH ATS9360, a 1-channel, 12 bit, 1.8 GS/s PCI card, card from Alazar Technologies Inc. of Pointe-Claire, QC, CA), an infrared photon detector (e.g., a SINGLE QUANTUM EOS multi-channel SNSPD photon detector from Single Quantum, Delft, ZH, NL, or an ID230 NIR photon detector from ID Quantique SA, Carouge, GE, CH). Further detectors are described herein at, at least, FIG. 2.

Analog device 150 includes an environment subsystem 152, which in response to execution of the environment instructions 134, provides a prescribed environment for special information processor 154. Aspects of a prescribed environment may include, for example, one or more of moisture, air pressure, vibration, magnetic field, temperature, and electromagnetic fields. In some implementations, environment subsystem 152 provides a low magnetic field around special information processor 154. In some implementations, environment subsystem 152 provides a time invariant magnetic field around information processor 154. In some implementations, environment subsystem 152 provides a time varying or pulsed magnetic field. In some implementations, environment subsystem 152 maintains the information processor 154 at cryogenic temperatures by one or more refrigeration units, and/or cold sources. For example, information processor 154 may be maintained near 4 K. Other useful temperatures for information processor 154 include temperatures in a range from about 1 mK to about 77 K. In some implementations, environment subsystem 152 maintains processor 154 in a range from about 1.5 K to about 4 K. In some implementations, environment subsystem 152 maintains the environment around information processor 154 at a temperature of about 290 K. In some implementations, environment subsystem 152 includes vibration isolation components, such as, dampeners in refrigeration units. In some implementations, environment subsystem 152 provides a low moisture and constant air pressure (e.g., a stable vacuum) environment to special information processor 154.

Special information processor 154 may be a quantum device. Quantum devices are manufactures or structures in which quantum mechanical effects are noticeable and/or dominate. Quantum devices (such as, superconducting circuits and spintronic circuits) include circuits in which current transport is dominated by quantum mechanisms. Superconducting circuits use quantum physics phenomena such as tunneling and flux quantization. Spintronic circuits use the physical property of spin (e.g. electron spin) as a resource to receive, process, store, send, or output information. Quantum devices can be used for measurement instruments, in computing machinery, and the like. Examples of computing machinery include components of classical computers and quantum computers. Examples of quantum communication devices include switches, sources, and the like.

Analog device 150 includes a control subsystem 155. The control subsystem may include an input system 156, an output system 158, or both. The special information processor input subsystem 156, in response to processor-executable instructions, write to information processor 154, or manipulate information stored therein. The input subsystem 156 may be formed on the same substrate as information processor 154, physically coupled to information processor 154, communicatively coupled to information processor 154, or a mix of the preceding. In some implementations, input subsystem 156 includes a digital to analog converter. The input subsystem 156 may include one or more of an optical input subsystem, electric field subsystem, magnetic manipulation subsystem, mechanical subsystem, cryogenic subsystem, associated or included components, and the like. Examples of subsystems are described herein with reference to, at least, FIG. 2.

The input subsystem 156 may encode processor-readable information, including classical and quantum information, and transfer that information to information processor 154. The input subsystem 156 may include a light source to apply narrow or broad spectrum light (e.g., pulsed light) to parts of special information processor 154. In some implementations, input subsystem 156 includes an electromagnet to provide a magnetic field to parts or all of information processor 154. In some implementations, input subsystem 156 includes one or more emitters (e.g., wires, antennae, coils) to selectively provide control pulses for one or more times, durations, and frequencies to information processor 154. Example of a pulse generator is a PSPL10070A™ generator available from Tektronix, Inc. of Beaverton, OR, US. In some implementations, the emitters are on information processor 154. In some implementations, the emitters are proximate to information processor 154 and coupled to components or devices on it. Microwave, radio frequency (RF), and/or electromagnetic control pulses may be used. In some implementations, input subsystem 156 in conjunction with control subsystem 104 is used to perform electron paramagnetic resonance (EPR) and/or nuclear magnetic resonance (NMR) on electronic and/or nuclear spins in special information processor 154 and/or input subsystem 156. In some implementations, a bulk EPR or NMR cavity surrounds special information processor 154.

In some implementations, input subsystem 156 includes wires electrically (e.g., galvanically) coupled to one or more electrodes, or pairs of electrodes included in information processor 154. In some implementations, input subsystem 156 applies DC and/or AC currents to electrically bias and control information processor 154 from input subsystem 156. For example, input subsystem 156 may inject or remove carriers (e.g., electrons, and holes) from one or more parts of information processor 154. Or, in some examples, the input subsystem 156 provides static or oscillating electrical or magnetic fields. DC currents and voltages may be provided by low noise power sources such as battery-powered voltage sources. The currents and voltages may be applied through resistive voltage dividers/combiners. AC currents and voltages may be applied to parts of information processor 154 using an arbitrary waveform generator or signal generator, such as, a TELEDYNE LECROY ARBSTUDIO 1104™ waveform generator, available from Teledyne Technologies, Inc. of Thousand Oaks, CA, US. AC currents and voltages for electron spin resonance (ESR) may be applied to parts of information processor 154 using a signal generator, such as, an KEYSIGHT E8267D™ microwave vector signal generator. NMR control may be used and include creating signals by a vector signal generator, such as, the KEYSIGHT MXG N5182A RF™ vector signal generator. Both signal generators are available from Keysight Technologies of Santa Clara, CA, US. Lines leading from and/or to information processor 154, including those shown for example in FIG. 1, may include filters, e.g., low pass, band pass, and high pass filters.

Analog device 150, shown in FIG. 1, includes a special information processor output subsystem 158 to, at least, read from information processor 154. Output subsystem 158 may be formed on the same substrate as information processor 154, physically coupled to information processor 154, communicatively coupled to information processor 154, or a mix of the preceding. In some implementations, output subsystem 158 includes one or more of an analog to digital converter(s), amplifier(s), filter(s), and the like. In some implementations, output subsystem 158 includes an optical readout device or devices. An optical readout device (e.g., a photodetector) detects photons produced by, or in, the information processor 154 or measures the state of an optical structure included on, or in, information processor 154. An optical structure, such as a resonator, supports one or more photonic modes. Examples of optical structures are described herein. In some implementations, optical readout device(s) distinguish(es) between the presence, and absence, of one or more photons in the optical resonator. In some examples, optical readout device(s) detect(s) a frequency shift for one or more photonic modes of an optical structure. One optical readout device may readout the state of one or more optical resonators.

The state of an optical structure can be dependent on the occupation of a particular state of a luminescent defect, such as, a luminescent defect coupled to the optical structure. Examples of luminescent defects are described herein. In some implementations, output subsystem 158 includes one or more photo detector(s) such as a SINGLE QUANTUM EOS multi-channel SNSPD photon detector from Single Quantum, Delft, NL, or an 1D230 NIR photon detector from ID Quantique SA, Carouge, GE, CH.

In some implementations, output subsystem 158 includes one or more photo detector(s) such as APD110C or PDA20CS2 InGaAs avalanche photodetectors available from Thorlabs Canada ULC, Saint-Laurence, QC, CA; superconducting on chip photon detector described in Akhlaghi et al., 2015 *Nature Communications* 6: 8233; various detectors described in Eisaman, et al., 2011 *Rev. Sci. Instrum.* 82, 071101; or ADN3010-11 detector from Analog Devices, Inc. of Norwood, MA, US.

In some implementations, digital computer 102 uses output subsystem 158 to perform logical operations on information in information processor 154. For example, output subsystem 158 may be used to perform measurements on quantum states stored in or on information processor 154, e.g., see at least, FIGS. 7 and 9.

In some implementations, output subsystem 158 performs single shot readout on the state of components in information processor 154. In some implementations, output subsystem 158 performs readout on the state of components in information processor 154 at gigahertz speed.

In some implementations, output subsystem 158 receives (e.g., receives, requests and receives) quantum non-demolition measurement readout results on the state of components in information processor 154. In some implementations, output subsystem 158 performs readout on the state of one or more ancillary photons that have interacted with at least one component in information processor 154.

In some implementations, analog device 150 is communicatively coupled to a communication channel 170, e.g., classical communication, or quantum information channel. The channel 170 can be used to send information (e.g., quantum information, classical information) to and from information processor 154. The channel 170 may communicatively couple information processor 154 and one or more information processors, such as, a second instance of information processor 154. The channel 170 may communicatively couple information processor 154 to another device, such as, photon generator.

Figure 5:
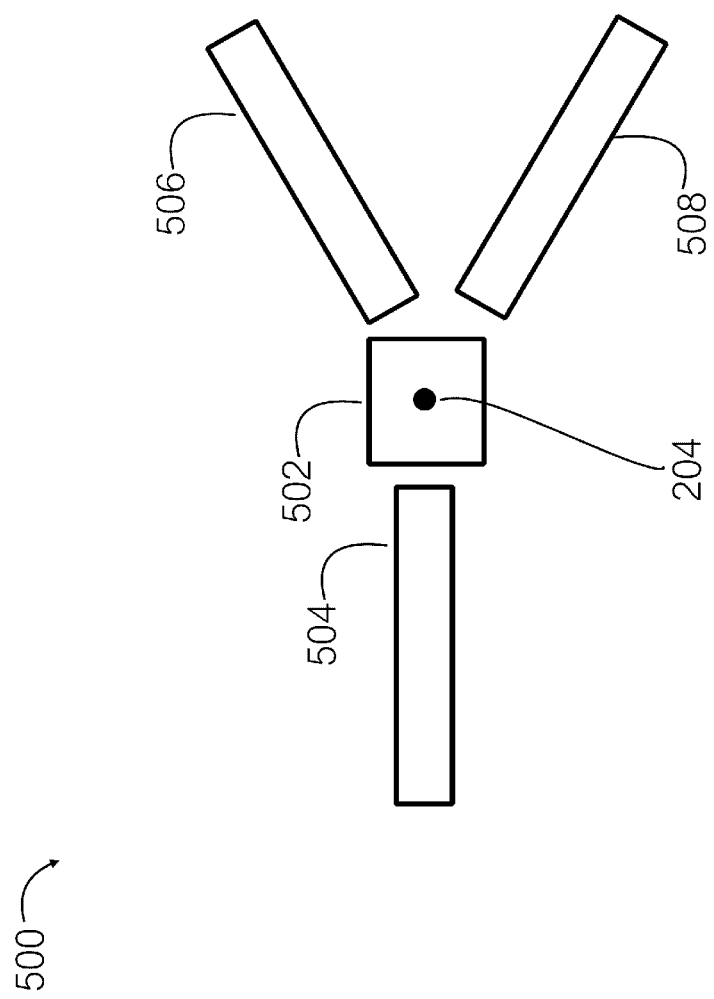
FIG. 5 is a schematic diagram illustrating a switch including a defect and a plurality of paths.

In some implementations, portions of digital computer 102 and analog device 150 are omitted to create a smaller information processing device including information processor 154, and channel 170. In some implementations, portions of digital computer 102 or analog device 150 are a communication device. For example, parts of digital computer 102 or analog device 150 may be used to implement a switch such as shown in FIG. 5.

Figure 2:
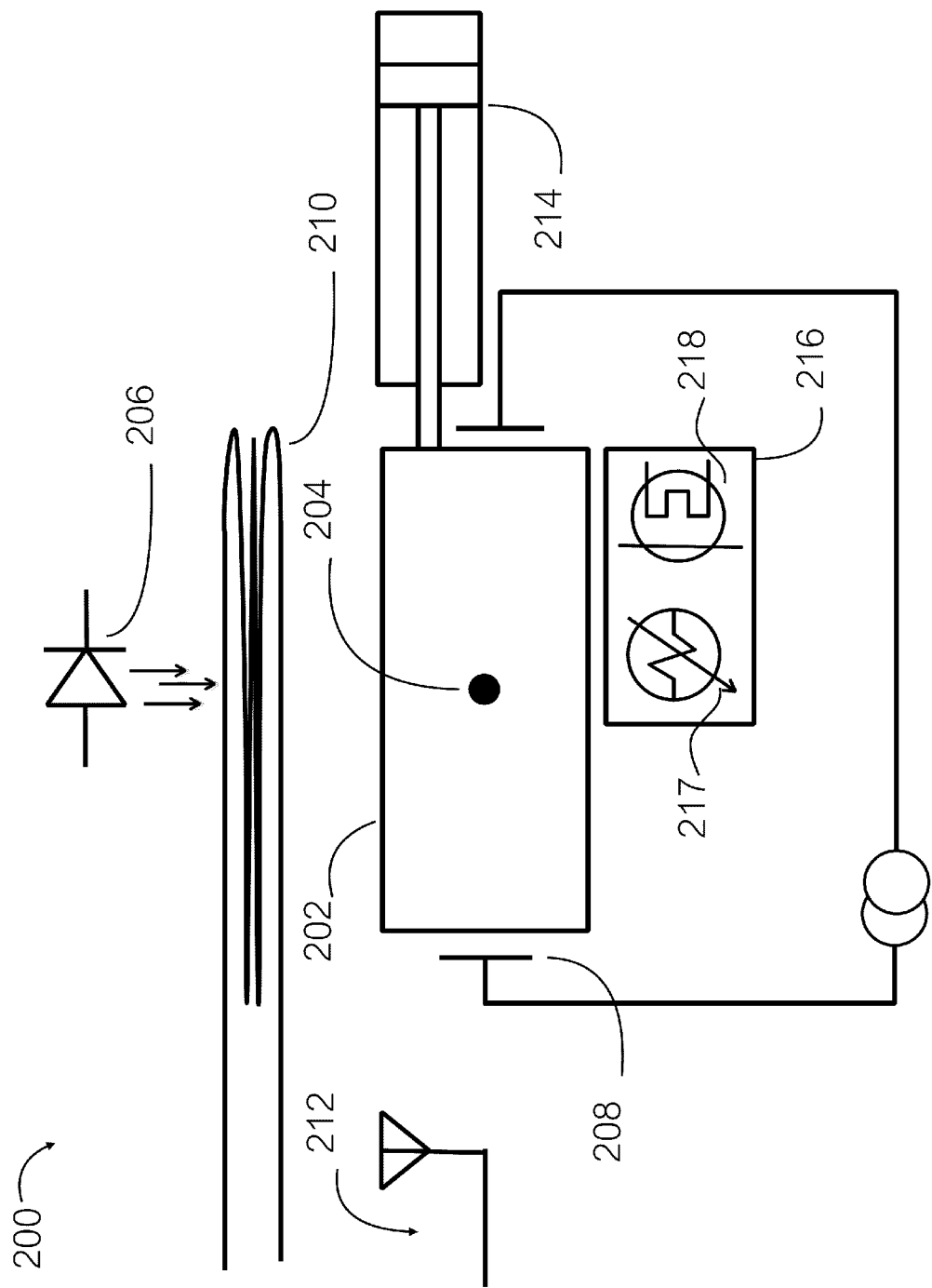
FIG. 2 is a schematic diagram illustrating an example defect and a body of semiconductor material.

FIG. 2 is a schematic diagram illustrating a part of a device 200. The illustrated part of device 200 includes a substrate of semiconductor material, body of semiconductor material, or semiconductor material 202, and an exemplary defect 204 disposed (e.g., created, formed, implanted, located, placed, situated) within the semiconductor material 202. Device 200 may be operated as an information processor, e.g., quantum information processor, optical processor, optical device, and communication device.

In some implementations, semiconductor material 202 includes silicon. Semiconductor material 202 can include natural silicon. Semiconductor material 202 can include other substances like silicon carbide or silicon germanium. In some implementations, semiconductor material 202 includes isotopically purified paramagnetic silicon, or a so-called silicon vacuum.

One way to increase performance metrics for a physical system (e.g., longer coherence time for a system such as device 200) is to use a semiconductor material processed to remove a large fraction of non-paramagnetic isotopes (e.g., silicon-29) that broaden spectroscopic measurements. Enriched or purified silicon has been processed to remove some to nearly all non-zero-nuclear spin isotopes, such as, silicon-29. Purified silicon includes material enriched to various levels of silicon-28, such as, 99%, 99.9%, and 99.99%. Purified silicon includes material enriched with silicon-28. Purified silicon includes silicon where spectroscopic linewidths are at least ten to hundred times sharper than in natural silicon. These defects showed examples of linewidth narrower by a factor of about: 50 (W-centre), and 200 (G-centre) in purified silicon.

A semiconductor body consisting principally of purified silicon can be produced or purchased. Production techniques include using, as an input material, purified silicon compound (e.g., by isotope, by magnetic properties) created by enrichment methods like gas centrifuge (e.g., silicon tetrafluoride), magnetic mass separation, or ion exchange. Purified gaseous silicon compounds may be part of purification or production process. Such compounds include purified silicon tetrafluoride ($SiF_4$), or purified silane ($SiH_4$).

Bodies, crystals, substrates, and wafers including purified silicon may be created using, amongst other methods, molecular beam epitaxy (MBE), and chemical vapor deposition (CVD). Available isotopically purified silicon includes removing silicon-29 to levels of tens, hundreds, thousands, or tens of thousands of parts per million. Suitable semiconductor material 202 may be purchased from Isoflex USA, an isotope supply company, of San Francisco, CA, US.

In some implementations, semiconductor material 202 is an epilayer of isotopically purified silicon, grown on top of a natural silicon wafer. The semiconductor material 202 may be on the order of a micrometer thick while the natural silicon wafer may be up to on the order of a millimeter thick. In some implementations, the semiconductor material 202 is a thin layer of silicon, grown or deposited on top of a body including insulating material such as silicon oxide, sapphire, silicon nitride, and the like. Here silicon can refer to natural silicon, purified silicon, or a silicon alloy such as a silicon-germanium blend, whose constituent components may be isotopically purified.

Defect 204 is disposed within the bulk of semiconductor material 202. The body of semiconductor material 202 is defined by a plurality of interfaces (e.g., faces, sides, or edges). Defect 204 is, in some implementations, disposed deep or far within the bulk or mass of semiconductor material 202. In at least one implementation, defect 204 is disposed at a shallow or near interface, e.g., distance equal to or less than 10 nanometers from an interface of the plurality of interfaces. In some implementations, defect 204 is disposed at a distance greater than 10 nanometers from an interface of the plurality of interfaces. In some implementations, defect 204 is evanescently coupled to an optical structure (e.g., resonator, waveguide, lens; not shown in FIG. 2). In some implementations, defect 204 is disposed at a distance greater than 10 nanometers from each interface of the plurality of interfaces. In some implementations, defect 204 is disposed at a distance greater than 30 nanometers from each interface of the plurality of interfaces. In some implementations, defect 204 is disposed at a distance between 30 and 500 nanometers from an interface of the plurality of interfaces. In some implementations, defect 204 is disposed at a distance between 10 nanometers and 2 microns from an interface for semiconductor material 202. Defect 204 may be disposed at a distance between 30 nanometers and 1 micron from each interface.

The further defect 204 is into body 202, the further defect 204 is away from charges that may reside on the interfaces of the body of semiconductor material 202.

Defect 204, and like modalities, may be formed out of one or more atoms or atomic vacancies (e.g. omitted silicon atoms), and these atoms locally occupy one or more reproducible specific relative positions to one another and to the lattice of semiconductor material 202. The crystalline pattern of silicon atoms may permit a type of defect, defined by its chemical composition and configuration, to have a number of distinct equivalent orientations relative to the lattice, however these distinct orientations are still attributed to the same defect type. The type of defect and implantation method vary with implementation. Silicon industry standard technique of ion implantation may be used to controllably implant the constituent components of defect 204 into semiconductor material 202. One implanting process is described in U.S. Pat. No. 3,434,894.

In some implementations, device 200 includes a defect 204 disposed within semiconductor material 202. Defect 204 may be a point, localized, or local defect in semiconductor material 202, e.g., silicon lattice. Local may refer to a defect whose atomic constituents or configuration differs from that of pure semiconductor across distances less than 5, 3, or 2 unit cell lengths, where the lattice constants of an undamaged lattice defines a cell length. For example, at least one interstitial silicon atom and/or at least one vacancy (the absence of a silicon atom) can define a defect. A defect may cause distortions (e.g. strain) in neighbouring cells beyond the size of the defect. A defect may support wavefunctions (e.g., electronic, or hole) which extend beyond the size of the defect as defined by its atomic constituents or configuration.

In some implementations defect 204 is a substitutional defect in which a lattice site in semiconductor material 202 contains a different atom than found in the neighbouring lattice sites. Defect 204 may be a vacancy; an empty lattice site which would be occupied in a crystal.

In some implementations, defect 204 is an interstitial defect where an atom occupies a non-lattice site. Defect 204 may be a Frenkel defect where an atom moves into an interstitial site and creates a vacancy. That is, a combination of interstitial and vacancy defects. Here atom includes at least one atom, ion, or molecule but the defect remains local.

Defect 204, or pluralities of the same, may be a damage centre, such as, a radiation damage centre. Defect 204 in semiconductor material 202 may constructed by one of a plurality of methods. One class of methods includes applying radiation to semiconductor material 202. In some implementations, applying an electron beam to semiconductor material 202 creates defect 204. Applying radiation may be followed by annealing the semiconductor material 202 at prescribed temperatures. For example, treating a silicon body with an electron beam and annealing near 100° C. creates a G-centre. Temperatures vary by defect, for example, a method for creating a T-centre may include annealing at 450° C.

Defect 204 may be formed from implanting carbon into semiconductor material 202. In some implementations, defect 204 is constructed by implanting electrons, neutrons, protons, or silicon or other atoms into semiconductor material 202 pre-contaminated with carbon.

Semiconductor material 202 may be a wafer including silicon. The wafer may be a silicon-on-insulator wafer such as a 220 nm thick wafer overlying silicon dioxide insulator. The silicon may be extrinsic silicon doped with substitutional donor or acceptors. The wafer may be subjected to a beam of carbon ions with beam energy between 5 and 100 keV (e.g., 20 keV, 30 keV, 40 keV). The wafer can be treated with further carbon ions at same or different (e.g., lower) energy.

Optionally the semiconductor material 202 may be annealed to repair damage during ion implantation. For example, semiconductor material 202 may be heated by furnace, heater, lamp, or laser to a high-temperatures (e.g., near or over 1,000° C.) on a timescale of several seconds to a few minutes. The semiconductor material 202 is cooled at a slow rate to prevent effects of thermal shock (e.g., breakage). The Rapid Thermal Anneal (RTA) and Rapid Thermal Processing (RTP) in semiconductor manufacturing are applicable. Semiconductor material 202 can be implanted with protons with a beam at two orders of magnitude higher than carbon ions, e.g., at 2 MeV.

In some implementations, defect 204 is a "luminescent defect" which may also be labelled a "luminescent impurity", "luminescent acceptor", or "luminescent donor" in an appropriate context. Luminescent defects include a pair of energy states where the decay process from the first state of the first pair of energy states to the second state of the first pair of energy states has a sufficient characteristic probability (e.g. 0.1%) of generating at least one optical photon. The characteristic probability of emitting at least one optical photon is the likelihood of optical photon emission from defect 204 when located in the bulk of an unstrained semiconductor body 202. The probability of optical photon emission from defect 204 when not in a bulk-like strain-free semiconductor environment can differ substantially from its characteristic optical photon emission probability through effects such as the Purcell Effect which can influence the local density of states. An optical photon is a photon with wavelength in the ultraviolet (UV), visible (VIS), or infrared (IR) bands, that is, wavelengths between about 10 nm and 100 µm.

Defect 204 may have a pair of energy states where the decay process from a first state of the first pair of energy states to a second state of the pair of energy states has sufficient photon generation probability of generating one optical photon and no phonons (e.g. quantized quasiparticles of vibrational energy). The transition energy of the optical photon is called a Zero Phonon Line (ZPL) transition energy.

Defect 204 can be of a type defined by its chemical composition and configuration and/or by physical property like a characteristic optical photon energy such as ZPL transition energy. The characteristic optical photon energies and typical photon generation probabilities of a defect can be modified by constituent atomic isotopes and/or the environment of the luminescent defect including but not limited to temperature, strain, pressure, electromagnetic fields, or the like. To a person skilled in the art it is clear that the characteristic transition energy and/or photon generation probability of a type of luminescent defect modified by the environment and/or isotopic composition of the luminescent defect does not constitute a distinct type of luminescent defect. The optical transition may be affected by a splitting as described herein.

Examples of local luminescent defects include so-called C, F, G, I3, P, W, X centres or the like including isovalent or isoelectronic replacements or substitutions. Examples of luminescent centres include so-called T, Ga1, and Al1 centres, or the like. Examples of luminescent centres include so-called I, M, and N-C centres, or the like. Each centre listed can be labeled by a short or long identifier, e.g., "T" or "T-centre".

For greater clarity aspects of these centres are described before returning to description of uses of these centres. A C-centre, is thought to comprise carbon and oxygen, is known to have a ZPL luminescence near 1570 nm (0.789 eV, 6364 cm$^{-1}$) in the so called L-band (1565-1625 nm). The L-band is one of five named telecommunication bands covering 1260 nm to 1625 nm where optical fibers have low loss. An F-centre, has a luminescence near 1304 nm (0.9508 eV, 7668 cm$^{-1}$, O-band). A G-centre has a luminescence near 1280 nm (0.969 eV, 7823 cm$^{-1}$, O-band). An I3-centre has ZPL luminescence near 1041 nm (1.041 eV, 8396 cm$^{-1}$) in the near IR. A P-centre has a luminescence near 1616 nm (0.767 eV, 6186 cm$^{-1}$, L-band). A W-centre has characteristic emissions near 1218 nm (1.018 eV, 8210 cm$^{-1}$, near IR). An X-centre has a characteristic ZPL transition near 1088 nm (1.14 eV, 9195 cm$^{-1}$).

A T-centre is thought to include two carbon atoms and one hydrogen atom and has a characteristic ZPL optical transition energy near 935.1 meV (7542.0 cm$^{-1}$, 1326 nm, O-band). The Ga1 defect has a luminescence near 1416 nm (875 meV, 7057.4 cm$^{-1}$, E-band). The Al1 (aluminum one) defect has a luminescence near 1483 nm (836 meV, 6742.8 cm$^{-1}$, S-band). These defects are thought to have chemical composition and configurations similar to a T-centre but are characterized by their stated properties.

An I-centre has ZPL transition near 1285 nm (0.965 eV, 7783 cm$^{-1}$, O-band). An M-Centre comprises a local defect in the silicon lattice (761 meV, near IR). The five N-C centres (also known as lines N1, N2, N3, N4, N5) have characteristic ZPL transition energies near 746 meV and each are thought to have distinct chemical and/or structural configurations. Further examples of defects with optical transitions are included in Gordon Davies, 1989 *Physics Reports* 176: 83-188.

Species and genera of defects described herein have one or more equivalents known to a person of skill the art. These equivalents include isovalent or isoelectronic replacements or substitutions for one or more atoms includes in the defects. Isoelectronic substitutions have the same number of valence electrons and include elements in the same period, e.g., germanium may replace carbon in a defect, or lithium replace hydrogen. Isoelectronic substitutions include charged atoms from adjacent periods. The isoelectronic substitutions affect the mechanical and electronic structure of a defect and substitutions may be used to vary the vibrational or optical interactions with the defect. The optical transition may be affected by a splitting as described herein.

In some implementations, device 200 includes acceptor defects or acceptor sites within semiconductor material 202 to receive electrons. One suitable defect for an acceptor site is boron. An acceptor could include an acceptor from Group III (13), e.g., boron, aluminum, gallium, and indium.

In some implementations, device 200 includes donor defect sites within the silicon material to donate electrons. One suitable defect for a donor site is phosphorus. A donor could include a donor from Group V (15), e.g., phosphorus, arsenic, bismuth and antimony.

Device 200 may include an optical structure (not shown). The optical structure can include a resonator, optical resonator, waveguide, optical coupler, optical cavity, cavity, other arrangement of refractive and reflecting material. In some implementations, defect 204 is evanescently coupled to one or more optical structures.

Device 200 may include an optical input subsystem comprising one or more optical components, such as, a light source 206. The optical component(s) are operable, e.g., act in response to execution of processor-executable instructions, to selectively apply light to defect 204. Light source 206 may apply light in a pulsed way. Optical components may apply light at, at least, a first frequency to defect 204. The first frequency corresponds (e.g., near, at) to an energy difference between the pair of computational states of defect 204. Light source 206 may be communicatively coupled to the processor(s) 105 in system 100 and operate in response to processor(s) 105 executing processor-executable instructions. The optical input component(s) (e.g., light source 206) may be disposed in, on, near, or distant (to) semiconductor material 202. The relative locations and orientations of the components shown in FIG. 2 have largely been chosen for illustrative purposes, for example, light from light source 206 need not be collinear with the magnetic field and perpendicular to the electric field and the like.

Device 200 may include one or more electric field subsystems including electrical components, such as, electrodes 208. The electric field subsystem(s) can act, e.g., in response to execution of processor-executable instructions, to apply an electric field of, at least, a first strength to semiconductor material 202 or defect 204. The electric field may include a gradient. That is the electric field subsystem(s) are operable to selectively vary an electric field incident on semiconductor 202. The electric field subsystem(s) effect changes in the energy eigenstates of defect 204. The electric field subsystem(s) may power components on or near semiconductor material 202. The electric field subsystem(s) may apply pulsed electrical manipulation of defect 204.

Device 200 may include one or more magnetic manipulation subsystems comprising one or more magnetic input components, such as, coil 210. The magnetic manipulation subsystem(s) can effect changes in the energy eigenstates of defect 204. The magnetic input component(s) are operable to selectively apply a magnetic field to semiconductor material 202 and/or defect 204 disposed within semiconductor material 202. The magnetic field may be oriented with respect to a lattice direction in semiconductor material 202 or a plurality of defects like defect 204. The magnetic field may be static or varying with respect to time or location in semiconductor material 202. In some implementations, magnetic input component(s) include a wide bore superconducting magnet. Processor(s) 105 in system 100 may, in response to executing processor-executable instructions, direct coil 210 to apply a magnetic field to semiconductor material 202.

A magnetic manipulation subsystem(s) included in device 200 may include at least one radio frequency input component, such as antenna 212, a pair of antennae, or the like, selectively operable to apply radio frequency pulses to semiconductor material 202 and/or the defect 204. Processor 105 may direct magnetic manipulation subsystem(s) (e.g., direct coil 210 and antenna 212) to flip an electronic or a nuclear spin associated with the defect 204.

Processor(s) 105 in system 100 may direct the magnetic input components and the radio frequency input component to perform magnetic resonance control, e.g., NMR and/or ESR, of defect 204 or a plurality of defects. For example, coil 210 may apply a field of strength $B_0$ to defect 204 and antenna 212 a radio frequency pulse at frequency that is proportional to the product of field of strength $B_0$ and the gyromagnetic ratio $\gamma$ for a spin of defect 204 and adjusted for additional interaction(s) of the spin in device 200.

Device 200 may include a mechanical subsystem comprising one or more mechanical input components. An example of a mechanical input component is an actuator 214. Actuator 214 may be paired with a rest or support (not shown) disposed on an opposing side of semiconductor material 202. The mechanical input component(s) may be operable, e.g., in response to executing processor-executable instructions, to selectively vary (e.g., apply, remove) a strain in at least one direction to semiconductor material 202. Thus, the mechanical subsystem can through the strain in semiconductor material 202 effect changes in the energy eigenstates of the defect 204. The mechanical input device(s) can impart strain locally within or across semiconductor material 202. The mechanical input component(s) may be disposed in semiconductor material 202 or be physically coupled to the exterior of semiconductor material 202. The mechanical subsystem may include one or more Micro-Electro-Mechanical Systems (MEMS) components that in response to execution of processor-executable instructions vary the strain in semiconductor material 202. The MEMS may be powered by the electric field subsystem(s). The mechanical subsystem may include one or more piezo-electric components.

Device 200 may include one or more cryogenic subsystems, such as, cryogenic subsystem 216. Cryogenic subsystem 216 is selectively operable to vary a thermal profile (e.g., temperature, temperature gradient, temperature with spatial or temporal variation) of semiconductor material 202 and effect changes in the energy eigenstates of defect 204. Cryogenic subsystem 216 may include one or both of a heater 217 or a cooler 218. Cryogenic subsystem 216 may be operable, e.g., in response to executing processor-executable instructions, to selectively warm, cool, or create a thermal gradient in semiconductor material 202.

In various implementations, examples of device 200 operate as information processors which include one or more input subsystem or devices communicatively coupled to semiconductor material 202 or defect 204. The one or more input subsystem or devices may be physically coupled to semiconductor material 202. For example, a quantum input subsystem may overlie the semiconductor material 202, be disposed near the semiconductor material 202, or be disposed within the semiconductor material 202.

The optical input component(s), the electrical input component(s), the magnetic input component(s), and the like may overlie (which includes underlies) a part of semiconductor material 202, or may be structures defined in semiconductor material 202. One or more output subsystem or readout devices are communicatively and/or physically coupled to semiconductor material 202 or defect 204. For example, a photon detector may be positioned like light source 206. Further examples of read out devices and detectors are described herein, at least, in relation to FIG. 4.

Figure 3:
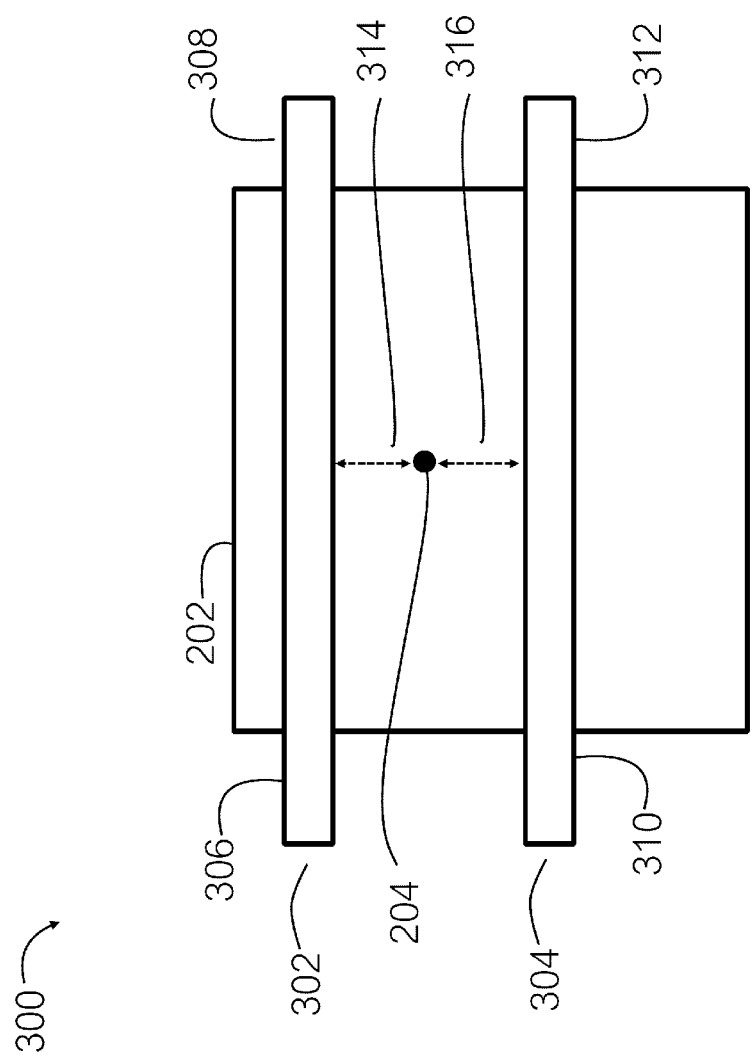
FIG. 3 is a schematic diagram illustrating an example of a communication device system including the defect and the body of semiconductor material shown in FIG. 2.

FIG. 3 schematically illustrates part of a communication device 300. The illustrated part of communication device 300 includes a body of semiconductor material 202, and a defect 204 disposed within the semiconductor material 202. Device 300 includes a plurality of wave guides, such as, first waveguide 302 and second waveguide 304. Device 300 may be operated as an information processor, e.g., quantum information processor, optical processor, optical device, and communication device. For example, device may be a channel-drop filter.

First waveguide 302 includes a first end 306 and a second end 308. Second waveguide 304 includes a first end 310 and a second end 312. First waveguide 302 passes by defect 204 separated by distance 314. Second waveguide 304 is separated from defect 204 by distance 316. Waveguide 302 and waveguide 304 are coupled by defect 204, e.g. evanescent coupling.

Communication device 300 may operate as an optical communication device used in communication or information processing known as a channel-drop filter. Given a signal traveling down a bus or first waveguide a channel-drop filter, under certain states for the filter or the signal, picks out or selects the signal and reroutes or drops the signal into a second or drop waveguide. A photon travelling by waveguide 302 may dependent on at least the state of the defect 204 be dropped into waveguide 304. For example, the photon travels from first end 306 of the first waveguide 302 may be selected drop into the second waveguide 304 and travel toward the second end 312. The photon may be absorbed and (re)emitted. Such an emanating photon can be regarded as the same photon that was absorbed.

Figure 4:
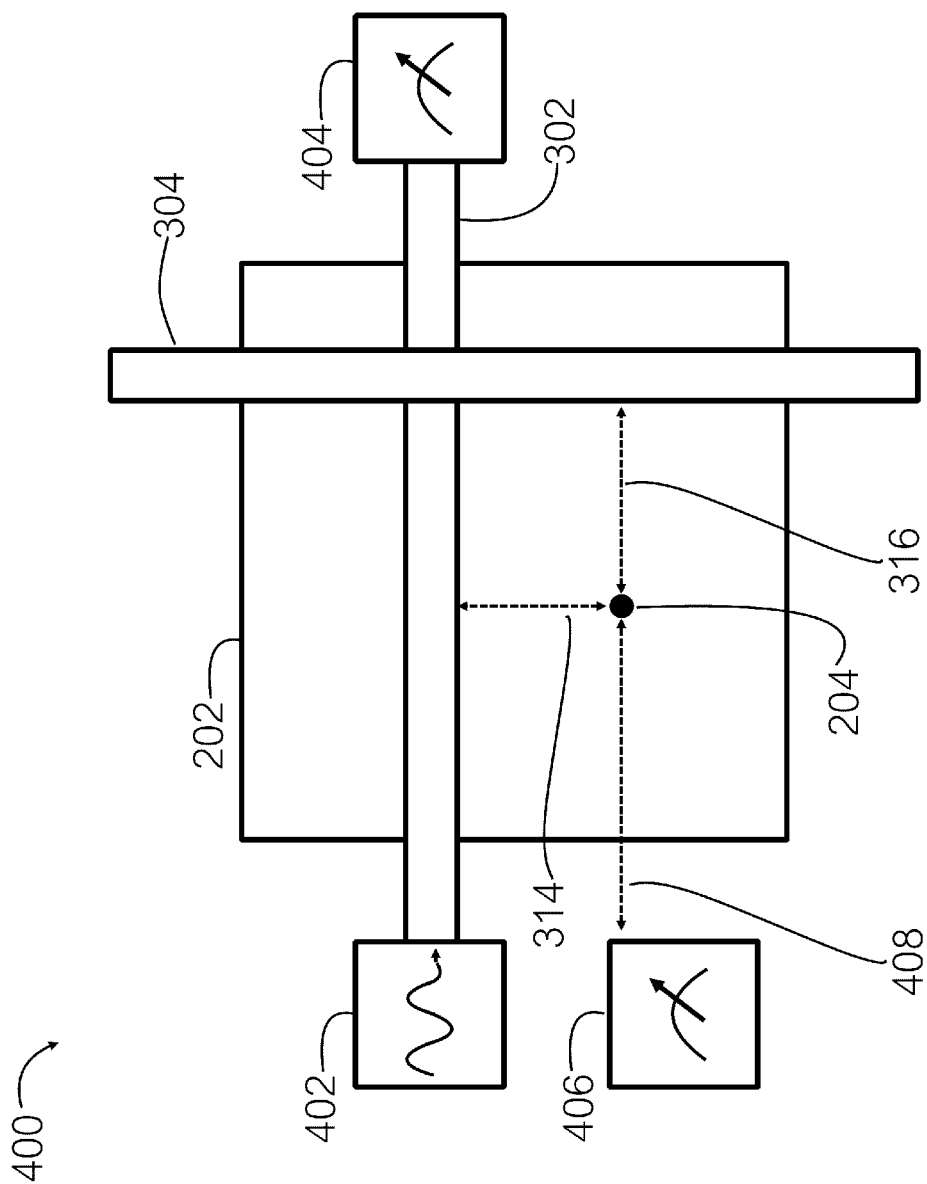
FIG. 4 is a schematic diagram illustrating an example of an information processing device system including components shown in FIGS. 2 and 3.

FIG. 4 schematically illustrates part of a communication device 400. The illustrated part of communication device 400 includes a body of semiconductor material 202, a defect, a first waveguide 302, and a second waveguide 304. Device 400 may be operated as an information processor, e.g., quantum information processor, optical processor, optical device, and communication device.

Device 400 further includes a photon source 402 communicatively coupled to first waveguide 302. Photon source 402 may generate a photon in a pre-determined state to travel by first waveguide 302 past defect 204. The photon may be measured at photon detector 404 coupled (e.g., communicative, physically) to first waveguide 302. A photon detector could be coupled to second waveguide 304.

Device 400 may further include a measurement device 406 communicatively coupled to defect 204. Measurement device 406 may measure the state of defect 204. See description of measurement herein at, at least, FIG. 7 and FIG. 9. Defect 204 is coupled to waveguide 302, waveguide 304, and measurement device 406; separated by distances 314, 316, and 408 respectively.

FIGS. 3 and 4 illustrate one example of path a photon can take namely spatial mode of one waveguide or another. Other paths are possible including differing polarizations, time bin encodings, frequency modes, Fock states, and the like. Two paths may occupy the same waveguide.

FIG. 5 schematically illustrates a part of a communication device or switch 500. Switch 500 includes a region of semiconductor material 502, e.g., part of semiconductor material 202, and defect 204 disposed in the region of semiconductor material 502.

Switch 500 includes an input path 504 communicatively coupled to the defect 204. Switch 500 includes a first output path 506 communicatively coupled to defect 204, and a second output path 508 communicatively coupled to defect 204. A photon emanating from defect 204 is directed into either first output path 506, or second output path 508, dependent on, at least, a computational state of defect 204. The photon may be directed into either first output path 506, or second output path 508, dependent on, at least, the computational state of the defect 204, and the state of the photon.

Figure 6:
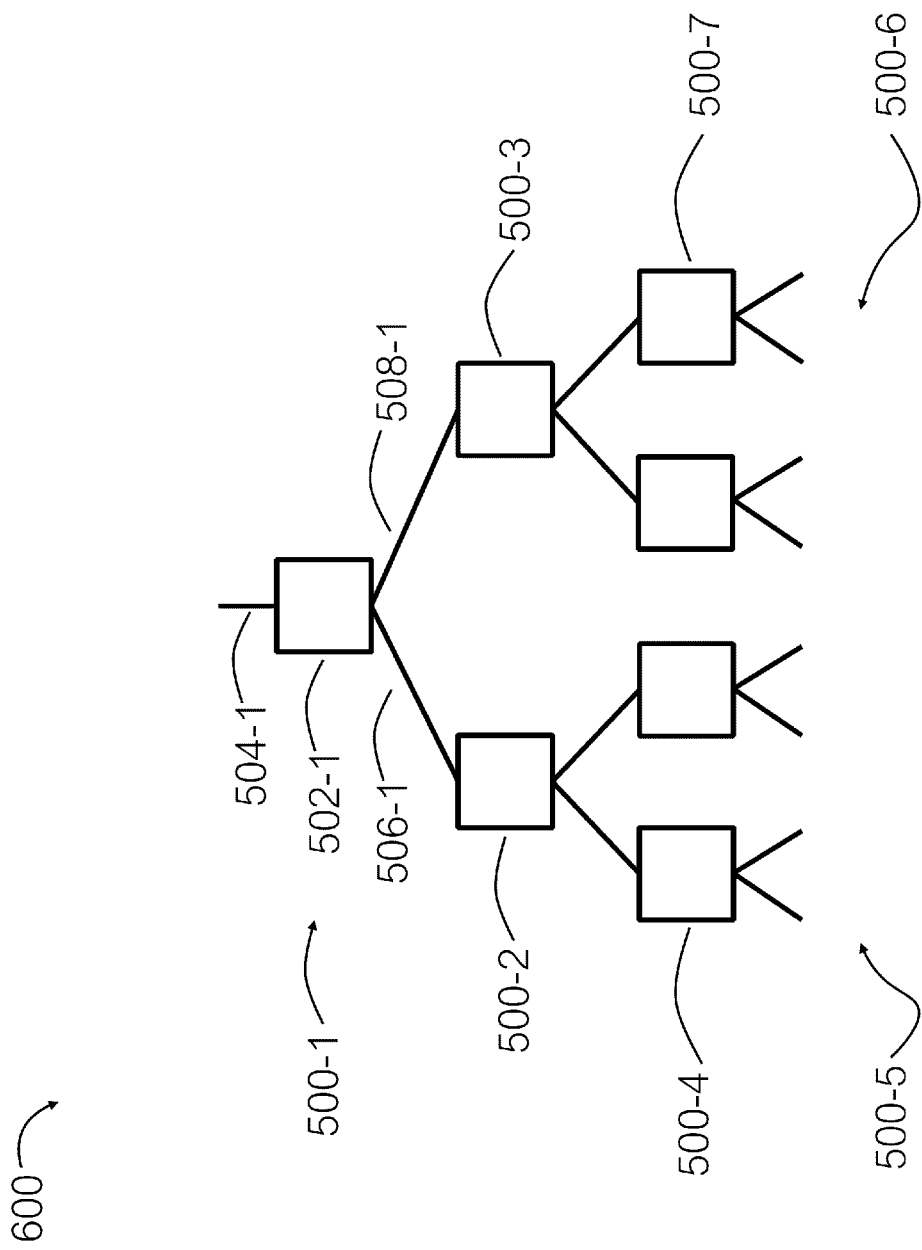
FIG. 6 is a schematic diagram illustrating a plurality of switches like shown in FIG. 5 coupled by a plurality of paths.

FIG. 6 schematically illustrates a part of a communication device or network 600. Network 600 includes a plurality of switches 500, e.g., switch 500-1, switch 500-2, coupled by a plurality of paths, e.g., path 506-1, path 506-2. As shown network 600 is a tree with uniform branching ratio of two, is balanced, and not ragged. In some implementations, a network like network 600 is unbalanced, ragged, and has nonuniform branching ratio. In some implementations network 600 is a different graph, such as, a directed acyclic graph.

Network 600 includes a plurality of switches. Switch 500-1 is communicatively coupled to switch 500-2 by output path 506-1. Switch 500-1 is communicatively coupled to switch 500-3 by output path 508-1. Switch 500-2 is communicatively coupled to switch 500-4 and switch 500-5. Switch 500-3 is communicatively coupled to switch 500-6 and switch 500-7.

In some implementations, the network 600 may operate as a demultiplexer. A demultiplexer is an electronic device which, in response to receiving an input signal, directs an output signal to one of a plurality of output paths.

Figure 7:
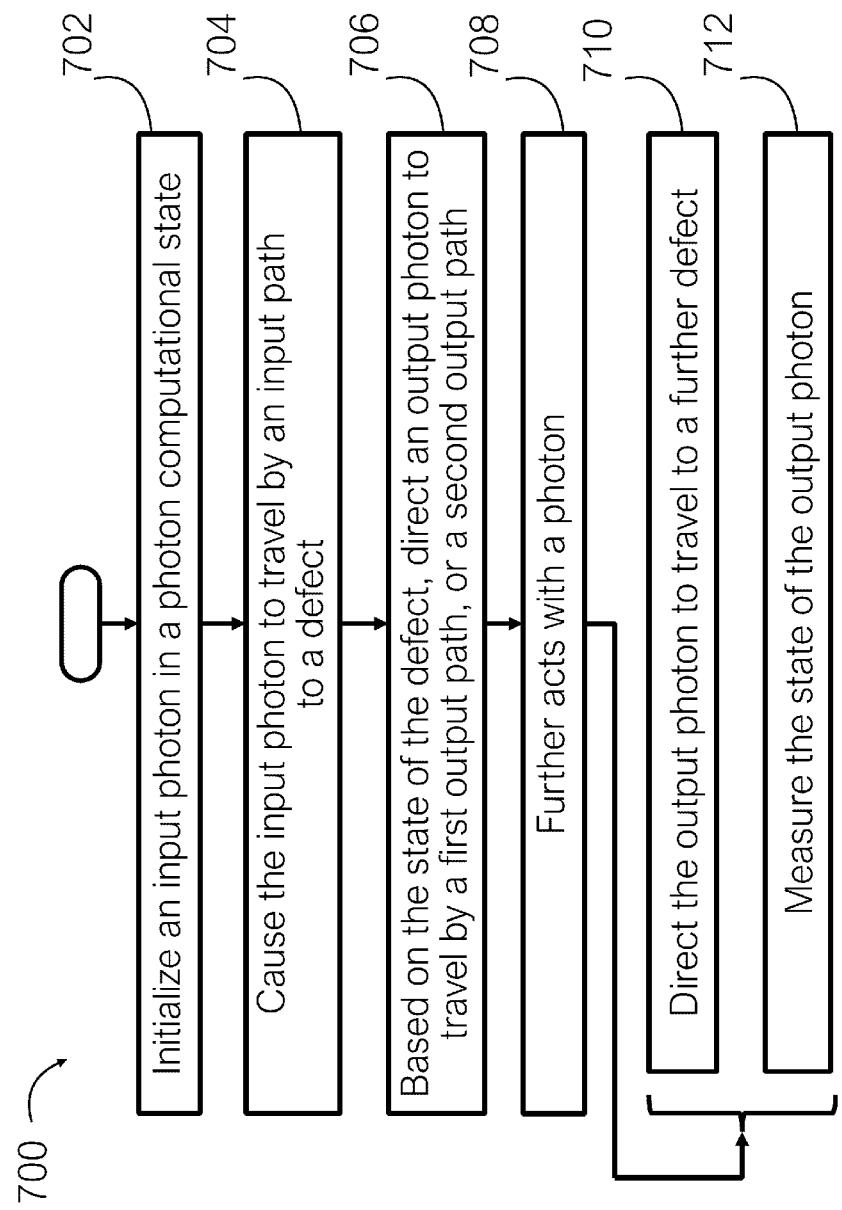
FIG. 7 is a flow-diagram illustrating an implementation of an example method of operation of a communication device including two or more photons.
Figure 8:
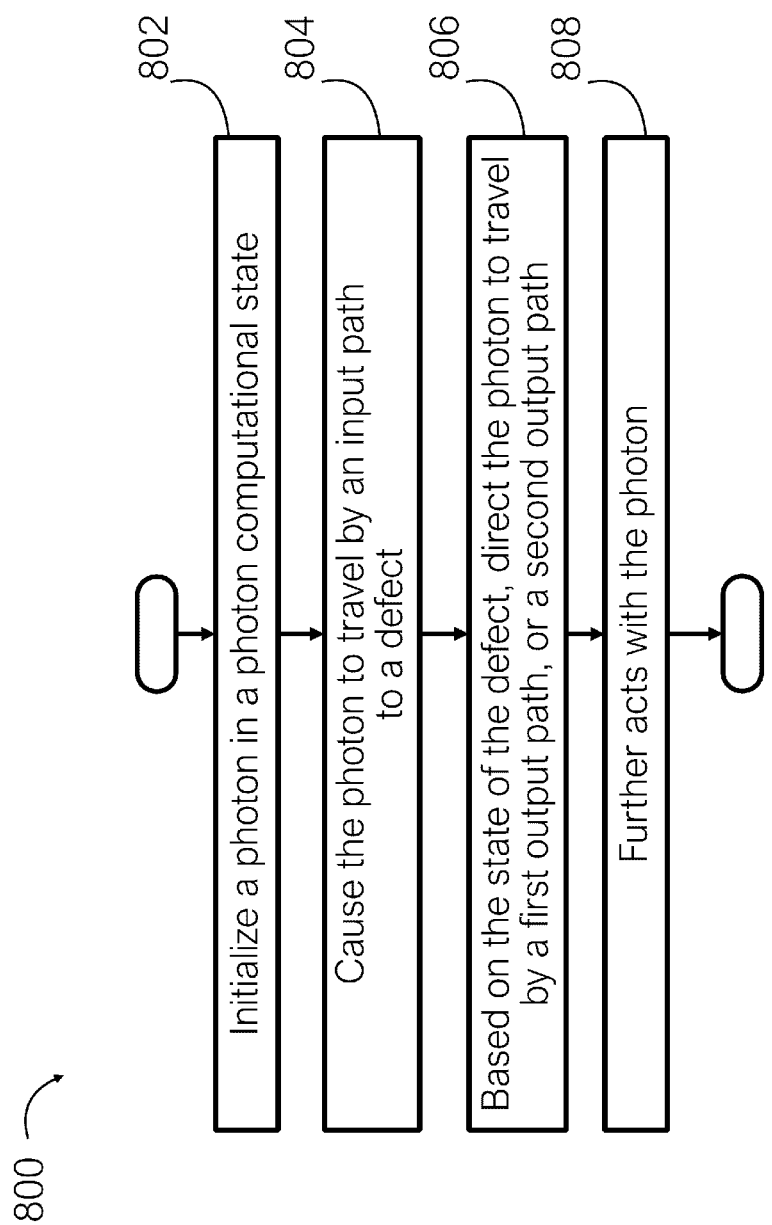
FIG. 8 is a flow-diagram illustrating an implementation of an example method of operation of a communication device, the implementation including one photon.
Figure 9:
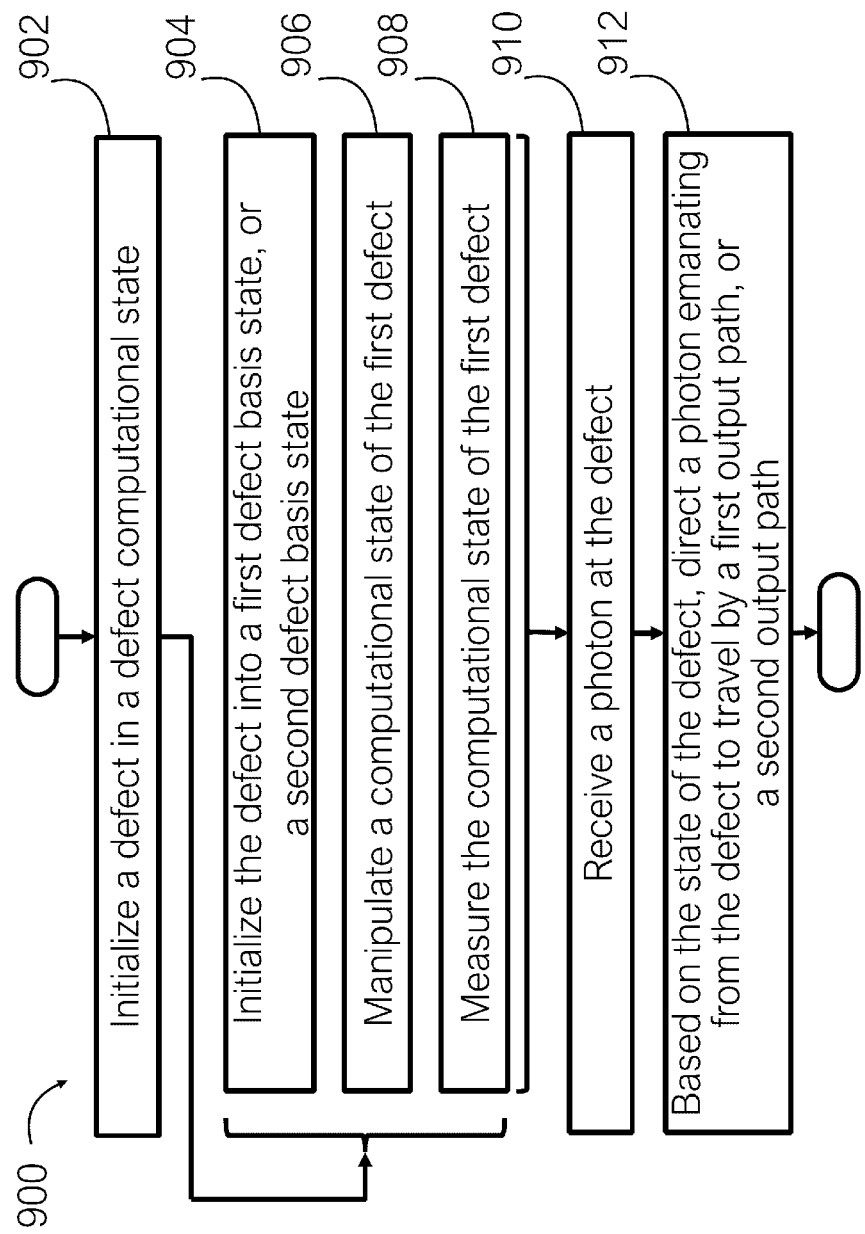
FIG. 9 is a flow-diagram illustrating an implementation of an example method of operation of a communication device, the implementation including a local defect.

FIGS. 7, 8, and 9 illustrate exemplary methods of operation for a communication device, such as, device 300 or switch 500, or an information processor, such as, special information processor 154 or device 200. FIG. 7 describes a method related to two photons—input photon and output photon. FIG. 8 describes a method related to one photon, e.g., the input photon is the output photon, the output photon has the state of the input photon, the output photon state depends on at least the input photon state. FIG. 9 illustrates a method with one or two photons from the perspective of a defect included in the information processor.

FIG. 7 illustrates an example method 700 (including, for example, acts 702, 704, and so on) of operation for a communication device. For method 700, as with other methods taught herein, the various acts may be performed in a different order than that illustrated and described. Additionally, the methods can omit some acts, and/or employ additional acts. One or more acts of method 700 may be performed by or via one or more circuits, for instance, one or more hardware processors. In some implementations, method 700 is performed by a controller, e.g., control subsystem 104 of system 100.

Method 700 normally begins by invocation from a controller.

At 702 the controller initializes a first or input photon in an input photon computational state. The photon computational state may be a first photon basis state like horizontal polarization, a second photon basis state like vertical polarization, or a superposition of two basis states. The input photon emanates from a photon source and may travel through optional optical devices to create the first photon computational state.

At 704 the controller causes the input photon to travel by an input path to a defect. The input path is communicatively coupled to the defect. For example, the input photon may travel by input path 504 to region 502 including a defect 204. At defect 202, the input photon may be absorbed, reflected, transmitted, or subject to other physical action based on, at least, the state of defect 204.

At 706 the controller, based on the state of the defect, directs, or causes the direction of, a second or output photon to travel by a first output path, or a second output path. For example, the controller directs the output photon to travel by output path 506 from switch 500. Another example includes the output photon travelling by waveguide 304.

At 708 the controller causes further action of the system such as 710 or 712. At 710 the controller causes the output photon to travel to a second or further defect. The second defect may be communicatively coupled to the first output path, or the second output path. Processing at the further defect may include invoking an instance of method 700 again. At 712 the controller causes the state of the output photon to be measured.

Method 700 ends until invoked again. Method 700 may be followed by one or more other methods including one or more further instances of method 700.

FIG. 8 illustrates an example method 800 (including, for example, acts 802, 804, . . . , etc.) of operation for a communication device. An instance of method 800 includes one photon.

Method 800 normally begins by invocation from a controller.

At 802 the controller initializes a photon in a photon computational state. A photon may encode information in many ways such as, spatial mode, e.g. no photon present in a location or direction has a first logical value and a second logical value corresponds to presence. Further encodings include using orthogonal optical modes like the polarization, such as, horizontal versus vertical linear, or differing circular polarizations. Another encoding is the physical presence or absence of a photon during an interval or time bin. These bins can be repeated.

At 804 the controller causes the photon to travel by an input path to a defect. The input path is communicatively coupled to the defect. For example, the photon may travel by waveguide 302 to defect 204. At the defect the photon may be absorbed, reflected, transmitted, or subject to other physical action based on, at least, the state of the defect 204.

At 806 the controller, based on the state of the defect, directs, or causes the direction of, the photon to travel by a first output path, or a second output path. For example, the photon travels by waveguide 304 or waveguide 306. The photon may include quantum information or classical information. For example, photon can be in a superposition of states.

At 808 the controller causes further action of the photon such as 710 or 712.

Method 800 ends until invoked again. Method 800 may be followed by one or more other methods.

FIG. 9 illustrates an example method 900 (including a plurality of acts) of operation for a communication device. One or more acts of method 900 may be performed by or via a controller including one or more circuits, for instance, one or more hardware processors, control subsystem 104 of system 100, or the like.

At 902 the controller initializes a defect in a defect computational state. The defect computational state is a first defect basis state, a second defect basis state, or a superposition of the first defect basis state and the second defect basis state. Initializing the defect in the defect computational state may include one or more occurrences of 904, 906, or 908.

At 904, the controller initializes, or causes the initialization of, the defect into a first defect basis state, or a second defect basis state. The first defect basis state, or the second defect basis state corresponds to a local degree of freedom at the defect. For example, nuclear spin down or nuclear spin up. Other local degrees of freedom include electron spin, hole spin, excitonic state, and energy level. The basis states of the defect can be formed from a combination of basis states of a plurality of local degrees of freedom. For example, nuclear spin and electron spin.

At 906, the controller manipulates, or causes the manipulations of, a computational state of the defect. For example, control subsystem 155 performs one or more classical or quantum operations on information stored in a local degree of freedom of defect 204. At 908, the controller measures, or causes the measurement of, the computational state of the defect.

At 910, the controller causes a photon to be received at the defect. The defect is disposed in a body of semiconductor material. The photon travels by an input path communicatively coupled the defect.

At 916 the controller causes, based on at least the state of the defect, a photon emanating from the defect to travel by a first output path, or a second output path. The photon emanating from the defect may be the (input) photon received at the defect at act 910 or an output photon based on the input photon. For example, the output photon shares a state with the input photon.

Method 900 ends until invoked again.

Method 900 may include further acts. For example, the controller measures, or causes the measurement of, the computational state of the defect. For example, the controller performs act 908. The controller may further cause, at 916, the photon emanating from the defect to travel by a first output path, or a second output path, based on the state of the defect and the state of the input photon.

Prior to acts shown methods 700, 800, or 900 the controller prepares, or cause the preparation of, an environment for the communication device including a body of semiconductor material and at least one defect. For example, the controller executes processor-executable instructions, which, when executed, cause an environment subsystem 152 and/or input subsystem 156 to prepare device 200. The controller may prepare the body of semiconductor material including one or more defects according to an electric profile, magnetic profile, thermal profile, or strain profile i.e., vary profile(s) for one or more of magnetic field, electric field, strain, and heat.

Further implementations are summarized in the following examples.

Example 1. An information processing system including a substrate, a first switch physically coupled to the substrate. The first switch includes a first region of semiconductor material, and a first local defect disposed in the first region of semiconductor material. The first local defect includes a first computational state selected from a first state, a second state, or a first superposition of the first state and the second state. The system also includes a first output path communicatively coupled to the first local defect, and a second output path communicatively coupled to the first local defect. A first photon emanating from the first local defect is directed into either the first output path or the second output path dependent on, at least, the first computational state of the first local defect.

Example 2. The system in Example 1, also including a second switch physically coupled to the substrate, and communicatively coupled to the first output path. The second switch includes a second region of semiconductor material, and a second local defect disposed in the second region of semiconductor material. The second local defect includes a second computational state selected from the first state, the second state, or a second superposition of the first state and the second state. The system also includes a third output path communicatively coupled to the second local defect, and a fourth output path communicatively coupled to the second local defect. A second photon emanating from the second local defect is directed into either the third output path or the fourth output path dependent on, at least, the second computational state of the second local defect.

Example 3. The system in Example 2, also including a third switch physically coupled to the substrate, and communicatively coupled to the second output path. The third switch includes a third region of semiconductor material, and a third local defect disposed in the third region of semiconductor material. The third local defect includes a third computation state selected the first state, the second state, or a third superposition of the first state and the second state. The system also includes a fifth output path communicatively coupled to the third local defect, and a sixth output path communicatively coupled to the third local defect. A third photon emanating from the third local defect is directed into either the fifth output path or the sixth output path dependent on, at least, the third computational state of the third local defect.

Example 4. The system in Example 3, where at least one of the first photon, second photon, or third photon is emitted, or re-emitted, by the first switch, the second switch, or the third switch.

Example 5. The system in Example 1, also including an input path communicatively coupled to the first local defect. The first photon travels by the input path to the first local defect. The first photon has a state.

Example 6. The system in Example 1, where the first photon is directed into either the first output path or the second output path dependent on at least the first computational state of the first local defect and the state of the first photon.

Example 7. The systems in Examples 2 or 3, where the first photon travels by the first output path to the second local defect, and the second photon is directed into either the third output path or the fourth output path dependent on at least the second computational state of the second local defect and the state of the first photon.

Example 8. The system in Example 3, where the first photon travels by the second output path to the third local defect, and the third photon is directed into either the fifth output path or the sixth output path dependent on at least the third computational state of the third local defect and the state of the first photon.

Example 9. The system in Example 3, also including a forth switch communicatively coupled to the fourth output path and the fifth output path. The fourth switch includes a fourth region of semiconductor material, and a fourth local defect disposed in the fourth region of semiconductor material. The fourth local defect includes a fourth computational state selected from the first state, the second state, or a fourth superposition of the first state and the second state. The system also including a seventh output path communicatively coupled to the fourth local defect, and an eighth output path communicatively coupled to the fourth local defect. A fourth photon emitted by the fourth local defect is directed into either the seventh output path or the eighth output path dependent on at least the fourth computational state of the fourth local defect.

Example 10. The system in Example 9, where the third photon travels by the fifth output path to the fourth local defect, and the fourth photon is directed into either the seventh output path or the eighth output path dependent on at least the fourth computational state of the fourth local defect and the state of the third photon.

Example 11. The system in Example 9, also including a body of semiconductor material including, at least two of, the first region of semiconductor material, the second region of semiconductor material, the third region of semiconductor material, and the fourth region of semiconductor material.

Example 12. The systems in Examples 1, 2, 3, 9, or 11 where the semiconductor material is silicon alloy, silicon, natural silicon, purified silicon, or principally consisting of purified silicon.

Example 13. The systems in Examples 1, 2, 3, or 9, where the first state and the second state are selected from the group consisting of a nuclear spin state, an electron spin state, a hole spin state, and an energy level.

In an example application one or more switches are configured to direct photons to one of a plurality of outputs or detectors. The one or more switches may be provided by a special information processor 154 as described above. Each of the one or more switches can comprise at least one defect in a semiconductor body. The semiconductor body may, for example comprise a silicon crystal which hosts the defect. The silicon crystal can advantageously comprise silicon from which paramagnetic atoms have been removed. for example the silicon may be enriched to various levels of silicon-28, such as, 99%, 99.9%, and 99.99%

The at least one defect is located in close enough proximity to an optical structure for the at least one defect to evanescently couple to the optical structure. The optical structure includes at least one optical waveguide that provides at least first and second output paths for optical photons.

Optical photons in different ones of the output paths are distinguishable. For example:

first and second output paths may be provided by first and second optical waveguides; and/or first and second output paths may be provided by different photon characteristics such as phase, polarization or timing.

Where the first and second output paths are provided by different optical waveguides, optical photons in the first and second output paths can be distinguished based on which of the first and second waveguides they are in.

Where the first and second output paths are provided by different photon characteristics, optical photons in the first and second output paths may be distinguished based on their characteristics. For example the first output path may comprise photons in a first polarization state and the second output path may comprise photons in a second polarization state. The second polarization state may be orthogonal to the first polarization state. As another example, the second output path may comprise photons that are phase shifted relative to photons in the first output path. As another example the second output path may comprise photons that are delayed relative to photons in the first output path. For example, the first output path may comprise groups of one or more photons that propagate in the optical structure at spaced apart allocated times and the second output path may comprise photons that are delayed so that they propagate in the optical structure at times between the times allocated for the first output path.

An optical photon may be delivered from the defect (e.g. the optical photon may originate as a result of a state transition in the defect) or may be delivered from an external source by way of the optical structure. Whether the optical photon is output on the first output path or the second output path depends on a state of the defect.

The defect may, for example have a first basis state in which the optical photon is caused to be output on the first output path and a second basis state in which the optical photon is caused to be output on the second output path. The first basis state may, for example, be a state in which an unpaired electron in the defect is spin down (higher energy) and the second basis state may be a state in which the unpaired electron in the defect is spin up (lower energy).

The defect may be initialized in a desired state using the input subsystem as described above. For example the input subsystem may be operated as described above to place the defect in the first basis state, the second basis state or a quantum superposition of the first and second basis states. In an example embodiment input subsystem 156 in conjunction with control subsystem 104 is used to initialize the defect into a desired state by performing electron paramagnetic resonance (EPR) and/or nuclear magnetic resonance (NMR) on electronic and/or nuclear spins in the defect. As another example, initializing the defect into a desired initial state may include operating one or more of: an optical input subsystem (e.g. to apply light having a photon energy corresponding to a transition between the first and second basis states), electric field subsystem, magnetic manipulation subsystem, mechanical subsystem, cryogenic subsystem of input subsystem 156.

In some embodiments the first and second basis states are selected such that the defect interacts more strongly with selected photons when in the first basis state than when in the second basis state or vice versa. For example, the defect, when in the second basis state may have a resonance that matches an energy of certain photons in the first optical structure that have a particular energy (i.e. a particular frequency or wavelength) whereas when the defect is in the first basis state the defect may not have a resonance that matches the energy of the certain photons. In such embodiments, the certain photons may interact with the defect in a way that causes the certain photons to be output to the second output path while other photons in the optical structure are output to the first output path.

In some embodiments the second basis state is a state in which an unpaired electron of defect 204 is spin up (lower energy) and the second basis state can undergo a transition which involves flipping the spin of the unpaired electron to a spin down (higher energy state). The energy required for this transition may be tuned to match the energy of photons that are intended to interact with defect 204 when defect 204 is in the second basis state.

Tuning the energy of a transition from the second basis state of defect 204 may be done by controlling environment subsystem 152 and/or input subsystem 156 to alter parameters which affect the energy of the transition from the second basis state. For example the tuning may involve one or more of:

operating a magnetic subsystem of input system 156 to set a magnetic field strength at the location of defect 204;

operating a mechanical subsystem of input system 156 to apply strain to the semiconductor in which defect 204 is located;

operating an electric subsystem of input system 156 to set an electric field at the location of defect 204; and/or operating one or more emitters of input subsystem 156 to selectively deliver microwave, radio frequency (RF), and/or electromagnetic radiation to the location of defect 204.

Placing the defect in a selected superposition of the first and second basis states may be done to allow a switch or network of switches as described herein to perform quantum computing operations. For example interaction of a first photon with a switch in which the defect is in a superposition of states may result in an output which consists of a state in which the first photon is on a first output path superposed with a state in which the first photon is on a second output path.

Figure 10A:
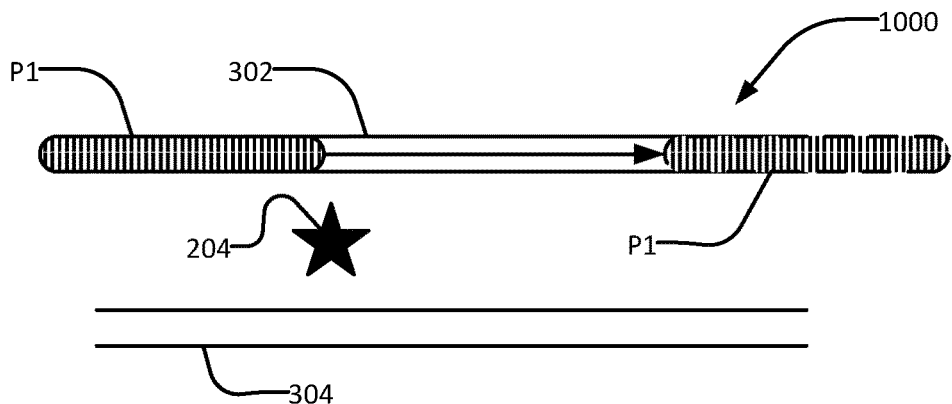
FIGS. 10A to 10D are schematic illustrations showing photons interacting with a defect where the photons are selectively output by first and second waveguides.

FIG. 10A to 10D are schematic illustrations showing how photons may be output differently depending on the characteristics of the photons and the state of a defect. In FIG. 10A an apparatus 1000 includes a defect 204 in a body of silicon or other semiconductor material. An optical structure includes optical waveguides 302 and 304. Defect 204 is within evanescent coupling range of waveguides 302 and 304.

In FIG. 10A defect is in a first basis state (indicated by dark fill). A photon P1 is delivered by waveguide 302 and is output on waveguide 302.

Figure 10B:
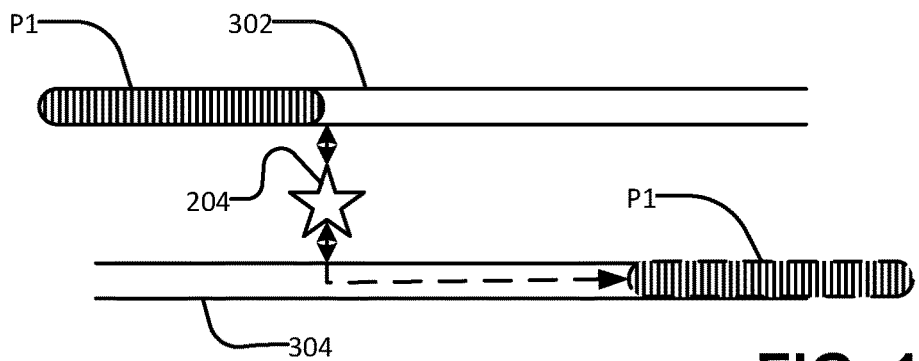

In FIG. 10B defect 204 is in a second basis state (indicated by white fill). A photon P1 is delivered by waveguide 302 and experiences a resonance with defect 204 which results in photon P2 coupling into second waveguide 304 and being output on second waveguide 304.

Figure 10C:
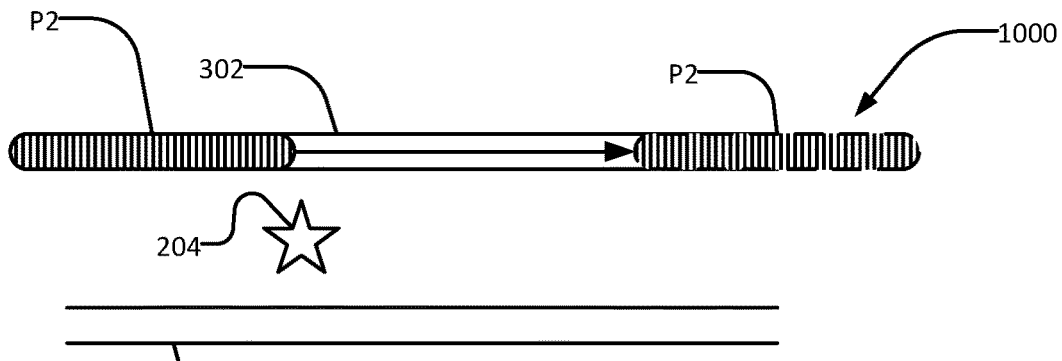

FIG. 10C is the same as FIG. 10B except that a photon P2 which has characteristics (e.g. a photon energy) different from photon P1 is delivered by optical waveguide 302. Photon P2 does not experience a resonance with defect 204 and is output by waveguide 302.

Figure 10D:
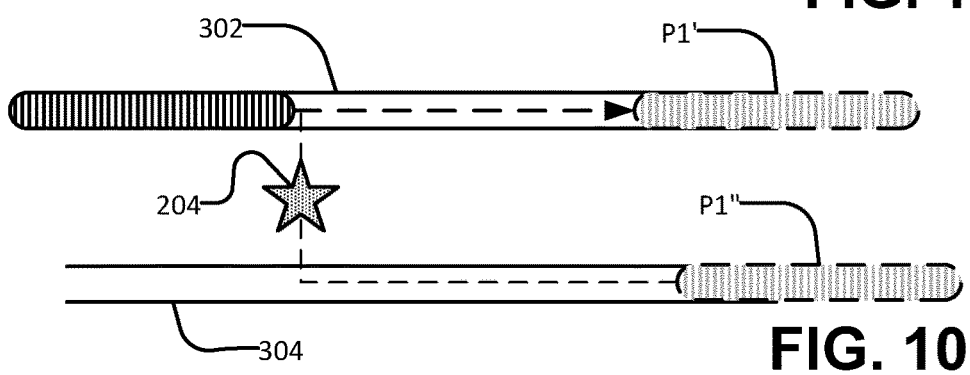

FIG. 10D is the same as FIG. 10B except that defect 204 is in a quantum superposition of the first and second basis states. When a photon P1 is delivered by optical waveguide 302, photon P1 is output as a superposition of photon P1' on first optical waveguide 302 and photon P1" in second optical waveguide 304.

In FIG. 10A to 10D a photon that interacts with defect 204 may be caused to be selectively output to second optical waveguide 304 in various ways, for example by:

asymmetrical coupling between defect and second optical waveguide 304 (defect 204 may be closer to or otherwise more strongly coupled to second optical waveguide 304 than to first optical waveguide 302);

and/or different polarization characteristics of first and second optical waveguides 302, 304 (e.g. interacting with defect 204 may change a polarization of a photon P1 from a polarization that is passed by waveguide 302 to a polarization that is passed by waveguide 304.

A number of switches of the type illustrated in FIG. 10A to 10D may be combined in a tree structure e.g. as illustrated and described with reference to FIG. 6.

Coupling between first and second optical waveguides 302, 304 to defect 204 may be increased, for example, by:

providing an optical cavity or resonator in proximity to defect 204; and/or making defect 204 be a plurality (ensemble) of defects 204 that are initialized in the same basis state.

An optical cavity or resonator may be configured as is known in the art to resonate at the frequency of photons P1 which are desired to interact with defect 204. electrical and/or magnetic fields of a photon P1 resonating in such a resonator or cavity may be concentrated such that coupling with defect 204 is increased.

FIGS. 11A through 11D illustrate operation of an example switch 1100 in which two output paths are provided in one optical waveguide. Switch 1100 comprises an optical waveguide 302 and a defect 204 in a semiconductor body near enough to optical waveguide 302 for photons in waveguide 302 to couple to defect 204. In the illustrated embodiment waveguide 302 includes an optional optical structure 303 (e.g. an optical chamber or optical resonator) configured to enhance coupling of selected photons to defect 204. Defect 204 may be prepared to be in a first basis state, a second basis state or a superposition of the first and second basis states as described above.

Figure 11A:
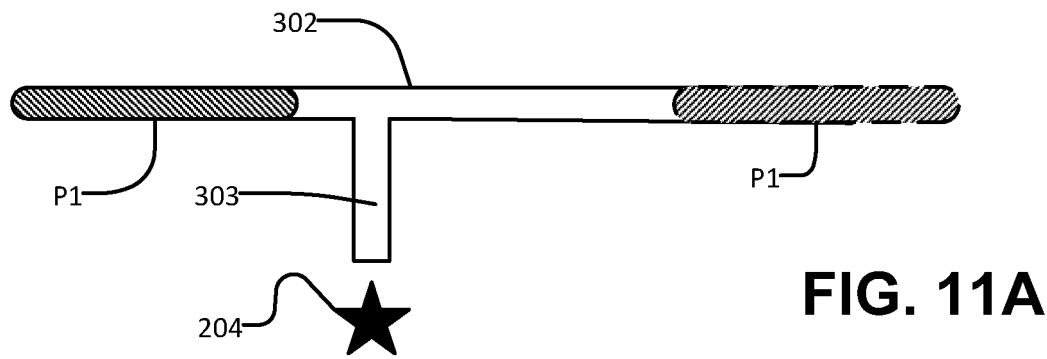
FIGS. 11A to 11D are schematic illustrations showing photons interacting with a defect where the photons are selectively output by first and second output paths in one waveguide.

In FIG. 11A, defect 204 is in the first basis state (indicated by dark fill). A photon P1 is delivered by waveguide 302. Photon P1 has a characteristic phase and/or polarization and does not interact significantly with defect 204. Photon P1 is output on waveguide 302 with its characteristics unchanged. A first output path includes photons P1 that pass by defect 204 without change to their characteristics.

Figure 11B:
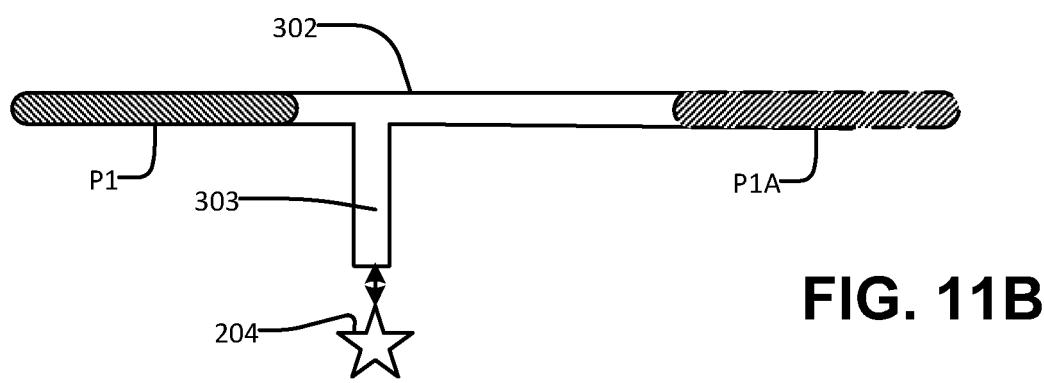

In FIG. 11B defect 204 is in a second basis state (indicated by white fill). A photon P1 is delivered by waveguide 302 and experiences a resonance with defect 204 which results in photon P1 having one or more characteristics changing, For example, the interaction with defect 204 may change the phase and/or polarization of photon P1. A changed photon PIA is output on waveguide 302. A second output path includes photons PIA having changed characteristics.

Figure 11C:
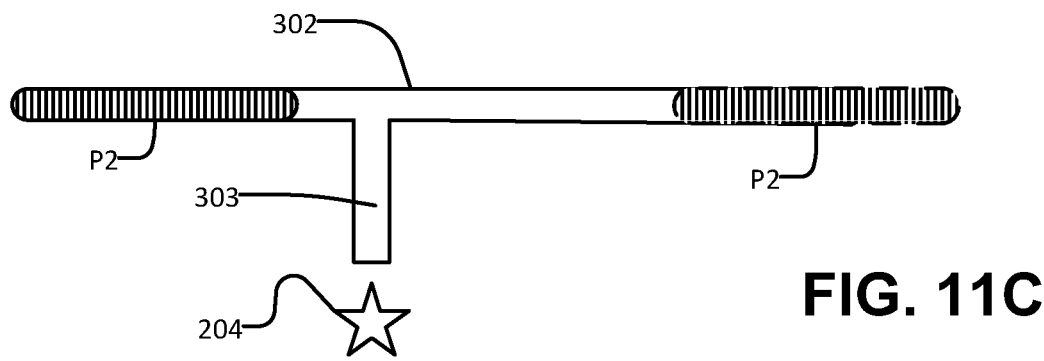

FIG. 11C is the same as FIG. 11B except that a photon P2 which has characteristics (e.g. a photon energy) different from photon P1 is delivered by optical waveguide 302. Photon P2 does not experience a resonance with defect 204 and is output unchanged on waveguide 302.

Figure 11D:
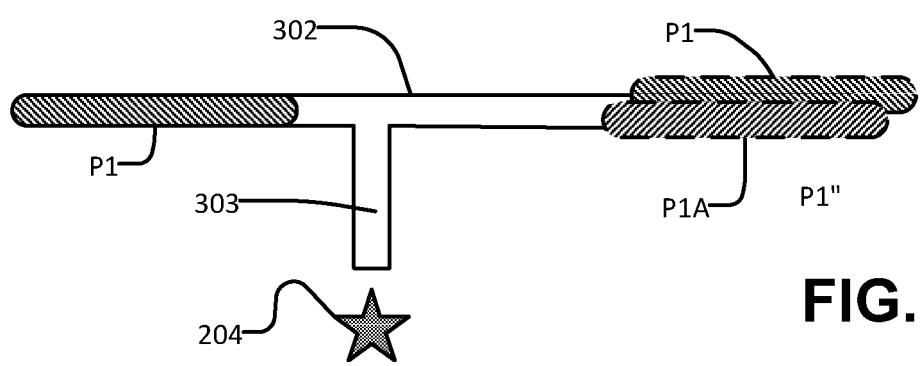

FIG. 11D is the same as FIG. 11B except that defect 204 is in a quantum superposition of the first and second basis states. When a photon P1 is delivered by optical waveguide 302 photon P1 is output as a superposition of photon P1 (having characteristics unchanged) and PIA (having changed characteristics) on first optical waveguide 302. In the FIG. 11D example, photon P1 is effectively output on both of the first and second output paths in superposition.

Figure 11E:
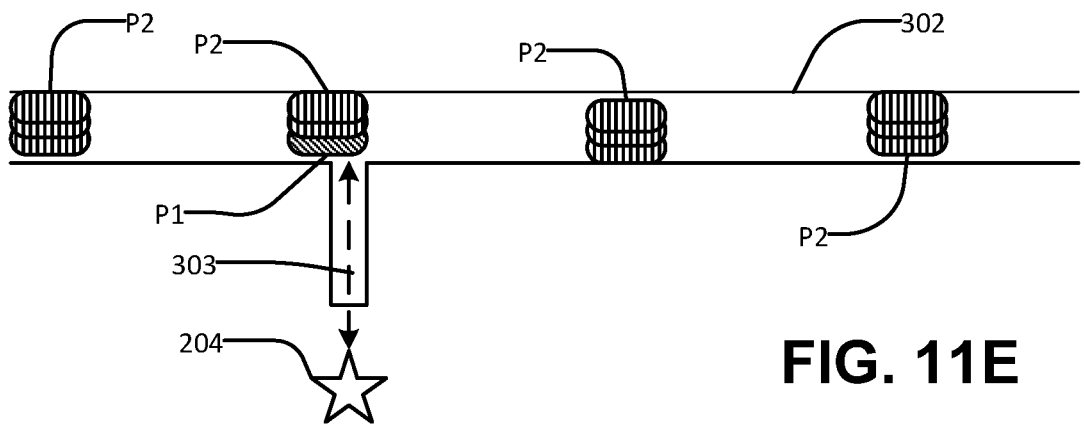
FIGS. 11E to 11G are schematic illustrations showing photons interacting with a defect where photons that interact with the defect are delayed relative to other photons.
Figure 11F:
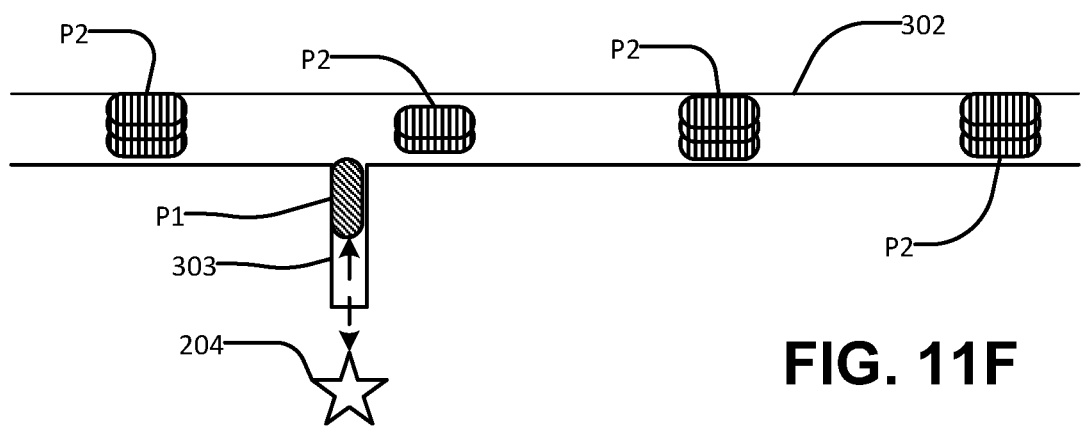
Figure 11G:
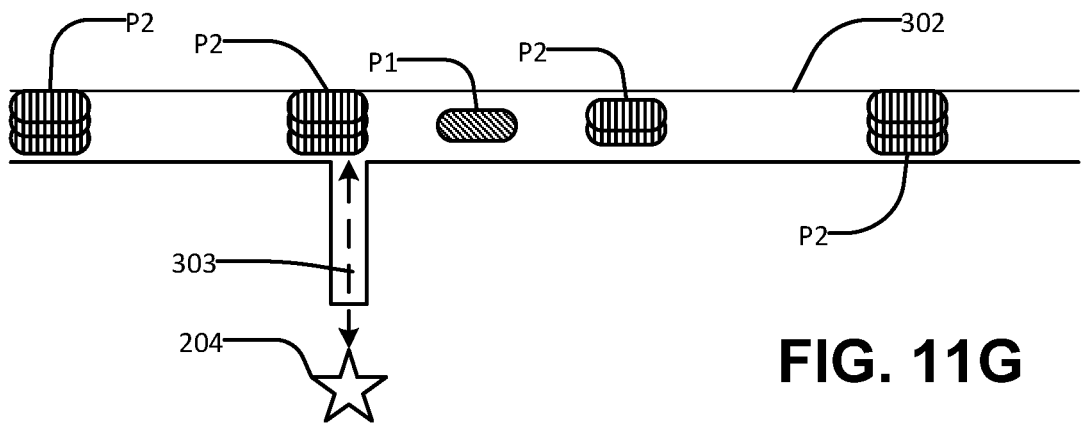

FIGS. 11E to 11G illustrate an example embodiment where first and second output paths are separated by time. FIG. 11E shows groups of photons passing along optical waveguide 302 past defect 204. The photons include photons P2 that tend not to interact with defect 204 (e.g. because they have the wrong energy and/or other characteristics to interact with defect 204) and photons P1 that do tend to interact with defect 204 when defect 204 is in the second basis state as described above.

In this example, a photon P1 passing defect 204 interacts with defect 204 in a way that takes time. For example, photon P1 may be absorbed and subsequently re-emitted by defect 204 (FIG. 11F). As a result, photon P1 is delayed relative to the photons it was originally grouped with (FIG. 11G).

Defect 204 may be a defect of any of the types described herein. In some embodiments defect 204 is a local defect. In some embodiments defect 204 is a T center or an ensemble of T centers.

Unless otherwise specified herein, or unless the context clearly dictates otherwise the term "about" modifying a numerical quantity means plus or minus ten (10) percent. Unless otherwise specified, or unless the context dictates otherwise, "between" two numerical values is to be read as between and including the two numerical values.

In the above description, some specific details are included to provide an understanding of various disclosed implementations. One skilled in the relevant art, however, will recognize that implementations may be practiced without one or more of these specific details, parts of a method, components, materials, etc. In some instances, well-known structures associated with semiconductor and/or optical devices and/or quantum computing and/or quantum information processing, such as targets, substrates, lenses, waveguides, shields, filters, lasers, processor-executable instructions (e.g., BIOS, drivers), have not been shown or described in detail to avoid unnecessarily obscuring descriptions of the disclosed implementations.

The following numbered paragraphs describe non-limiting example embodiments of the inventions described in the present disclosure:

1. A method for switching photons, the method comprising:
   providing a first defect in a body of a semiconductor material located near to first and second optical waveguides;
   selectively initializing the first defect to a first computational state selected from a first basis state in which the first defect couples to one or more photon modes in the first optical waveguide and a superposition of the first basis state and a second basis state; in which the first defect does not couple to the one or more photon modes in the first optical waveguide;
   delivering a first photon in the first optical waveguide; and
   coupling the first photon into to the second optical waveguide by way of the first defect.

2. The method according to example enumerated embodiment 1 (or any other example embodiment in this disclosure) wherein the first computational state comprises an electron spin state.

3. The method according to example enumerated embodiment 1 or 2 (or any other example embodiment in this disclosure) wherein the first photon has a first optical frequency and, when the defect is in the selected first computational state, the defect has an optical transition having an energy corresponding to the first optical frequency of the first photon.

4. The method according to example enumerated embodiment 3 wherein the energy of the transition is a Zero Phonon Line (ZPL) transition energy.

5. The method according to example enumerated embodiment 3 or 4 (or any other example embodiment in this disclosure) comprising delivering a first plurality of additional photons in the first optical waveguide, the first plurality of additional photons having optical frequencies different from the first optical frequency wherein the method comprises outputting the first additional photons by the first optical waveguide.

6. The method according to example enumerated embodiment 5 (or any other example embodiment in this disclosure) comprising delivering a second plurality of additional photons in the first optical waveguide, the second plurality of additional photons having the first optical frequency wherein the method includes coupling the second plurality of additional photons to the second optical waveguide by way of the defect.

7. The method according to any of example enumerated embodiments 1 to 6 (or any other example embodiment in this disclosure) wherein the first optical waveguide comprises an optical structure and the one or more photon modes are photon modes of the optical structure.
8. The method according to example enumerated embodiment 7 (or any other example embodiment in this disclosure) wherein the optical structure comprises an optical cavity or an optical resonator.
9. The method according to any of example enumerated embodiments 1 to 8 (or any other example embodiment in this disclosure) wherein the defect comprises an interstitial atom.
10. The method according to any of example enumerated embodiments 1 to 8 (or any other example embodiment in this disclosure) wherein the defect comprises a vacancy in a lattice of the semiconductor material.
11. The method according to any of example enumerated embodiments 1 to 8 (or any other example embodiment in this disclosure) wherein the defect comprises a damage centre.
12. The method according to any of example enumerated embodiments 1 to 8 (or any other example embodiment in this disclosure) wherein the defect comprises a luminescent defect.
13. The method according to example enumerated embodiment 12 (or any other example embodiment in this disclosure) wherein the luminescent defect comprises a T centre.
14 The method according to any of example enumerated embodiments 1 to 13 (or any other example embodiment in this disclosure) comprising after a time interval following selectively initializing the first defect to the first computational state, setting the first defect to a second computational state different from the first computational state;
    delivering a second photon in the first optical waveguide, the second photon having the first optical frequency; and
    outputting the second photon in the first optical waveguide.
15. The method according to example enumerated embodiment 14 (or any other example embodiment in this disclosure) wherein the second photon is identical to the first photon.
16. The method according to any of example enumerated embodiments 1 to 16 (or any other example embodiment in this disclosure) comprising delivering a stream of photons by the first optical waveguide and selectively directing photons of the stream of photons to be output by way of the first optical waveguide or the second optical waveguide by periodically changing the computational state of the first defect.
17. The method according to any one of example enumerated embodiments 1 to 16 (or any other example embodiment in this disclosure) wherein the defect is one of a plurality of first defects of the same type and the method comprises selectively initializing each of the plurality of first defects to the first computational state.
18. The method according to any of example enumerated embodiments 1 to 17 (or any other example embodiment in this disclosure) wherein the first defect is located more than 10 nanometers from any interface of the semiconductor body.
19. The method according to any of example enumerated embodiments 1 to 18 (or any other example embodiment in this disclosure) further comprising providing a second defect in the body of the semiconductor material located near to each of the second optical waveguide and a third optical waveguide;
    selectively initializing the second defect to a third computational state selected from a first basis state in which the second defect couples to one or more photon modes in the second optical waveguide and a superposition of the first basis state and a second basis state; in which the second defect does not couple to the one or more photon modes in the second optical waveguide;
    delivering the first photon in the second optical waveguide; and
    coupling the second photon into the third optical waveguide by way of the second defect.
20. The method according to any of example enumerated embodiments 1 to 19 (or any other example embodiment in this disclosure) comprising delivering a stream of photons in the first optical waveguide wherein a first subset of the photons comprises the first photon and constitutes a signal and by the first defect, selecting the signal and rerouting the signal to the second optical waveguide.
21. An information processing device comprising:
    a first region of semiconductor material;
    a local defect disposed in the first region of semiconductor material, the local defect supporting a computational state selected from: a first state, a second state, and a first superposition of the first state and the second state;
    a first input waveguide communicatively coupled to the local defect; and
    a first output waveguide communicatively coupled to the local defect wherein:
        the first output waveguide supports a first output path, and
        the device is configured so that a photon emanating from the local defect is directed into the first output waveguide and the first output path based at least on the computational state of the local defect.
22. The information processing device of example enumerated embodiment 21 (or any other example embodiment in this disclosure) wherein:
    the first output waveguide supports a second output path, and
    the photon emanating from the local defect is directed into the first output waveguide and either the first output path or the second output path dependent at least on the computational state of the local defect.
23. The information processing device of example enumerated embodiment 21 (or any other example embodiment in this disclosure) further comprising:
    a second output waveguide communicatively coupled to the local defect wherein:
        the second output waveguide supports a second output path, and
        the photon emanating from the local defect is directed into either
    the first output path or the second output path dependent at least on the computational state of the local defect.
24. The information processing device of example enumerated embodiment 21 (or any other example embodiment in this disclosure) wherein the photon emanating from the local defect arrives by the first input waveguide.

25. The information processing device of example enumerated embodiment 24 (or any other example embodiment in this disclosure) wherein:
    the photon has a photon computational state selected from a first photon basis state, a second photon basis state, and a superposition of the first photon basis state and the second photon basis state, and
    the photon emanating from the local defect is directed into the first output waveguide and the first output path dependent on, at least, the computational state of the local defect, and the photon computational state.

26. The information processing device of any of example enumerated embodiments 21 to 23 (or any other example embodiment in this disclosure) wherein the photon emanating from the local defect has a state dependent in part on the state of an input photon arriving at the local defect by the first input waveguide.

27. The information processing device of example enumerated embodiment 26 (or any other example embodiment in this disclosure) wherein:
    the input photon has an input photon computational state selected from a first photon basis state, a second photon basis state, and a superposition of the first photon basis state and the second photon basis state, and the photon emanating from the local defect is directed into the first output waveguide and the first output path dependent on, at least, the computational state of the local defect, and the input photon computational state.

28. The information processing device of any of example enumerated embodiments 21 to 27 (or any other example embodiment in this disclosure) wherein the semiconductor material is silicon alloy, silicon, natural silicon, or purified silicon.

29. The information processing device of example enumerated embodiment 28 wherein the semiconductor material consists principally of purified silicon.

30. The information processing device of any of example enumerated embodiments 21 to 29 (or any other example embodiment in this disclosure) wherein the first state and the second state supported by the local defect are selected from the group consisting of a nuclear spin state, an electron spin state, a hole spin state, and an energy level.

31. The information processing device of example enumerated embodiment 21 (or any other example embodiment in this disclosure) wherein the first output path is a spatial mode, polarization mode, time bin, frequency mode, or Fock state.

32. A photon switch comprising:
    a defect in a body of a semiconductor material, the defect having a plurality of available quantum states including a first basis state and a second basis state;
    an optical structure including an optical waveguide proximate to the defect, the optical waveguide providing a path for delivering photons to a vicinity of the defect;
    means for initializing the defect to be in an initial quantum state;
    wherein, when the defect is in the first basis state the photons are output on a first output path and when the defect is in the second basis state the photons interact with the defect and are output on a second output path.

33. The photon switch according to example enumerated embodiment 32 (or any other example embodiment in this disclosure) wherein the first and second output paths are carried by the first optical waveguide.

34. The photon switch according to example enumerated embodiment 33 (or any other example embodiment in this disclosure) wherein the first and second output paths respectively comprise the photons being in first and second polarization states and the interaction with the defect changes a polarization state of the delivered photons.

35. The photon switch according to example enumerated embodiment 33 (or any other example embodiment in this disclosure) wherein the first and second output paths respectively comprise the photons having first and second phases and the interaction with the defect changes a phase of the delivered photons.

36. The photon switch according to example enumerated embodiment 33 (or any other example embodiment in this disclosure) wherein the first and second output paths are separated by a temporal delay and the interaction with the defect delays the delivered photons.

37. The photon switch according to any of example enumerated embodiments 32 to 36 (or any other example embodiment in this disclosure) wherein the optical structure comprises an optical cavity or resonator located within an evanescent coupling range of the defect that concentrates electric and/or magnetic fields of the photons.

38. The photon switch according to any of example enumerated embodiments 32 to 37 wherein the semiconductor body comprises a silicon crystalline lattice.

39. The photon switch according to example enumerated embodiment 38 (or any other example embodiment in this disclosure) wherein the silicon is at least 99% silicon-28.

40. The photon switch according to any of example enumerated embodiments 32 to 39 (or any other example embodiment in this disclosure) wherein the defect is a local defect.

41. The photon switch according to any of example enumerated embodiments 38 to 40 (or any other example embodiment in this disclosure) wherein the defect comprises a vacancy in the silicon crystal lattice.

42. The photon switch according to any of example enumerated embodiments 38 to 40 (or any other example embodiment in this disclosure) wherein the defect comprises an interstitial atom in the silicon crystal lattice.

43. The photon switch according to any of example enumerated embodiments 38 to 40 (or any other example embodiment in this disclosure) wherein the defect comprises an radiation damage center in the silicon crystal lattice.

44. The photon switch according to any of example enumerated embodiments 38 to 40 (or any other example embodiment in this disclosure) wherein the defect comprises a T centre.

45. The photon switch according to any of example enumerated embodiments 32 to 44 (or any other example embodiment in this disclosure) wherein the defect comprises a plurality of identical defects.

46. The photon switch according to any of example enumerated embodiments 32 to 45 (or any other example embodiment in this disclosure) comprising a second optical waveguide located within an evanescent coupling range of the defect wherein the second output path is on the second optical waveguide.

47. The photon switch according to any of example enumerated embodiments 32 to 46 (or any other example embodiment in this disclosure) wherein the initial quantum state is selected from: the first basis state, the second basis state and a superposition of the first basis state and the second basis state.

48. The photon switch according to any of example enumerated embodiments 32 to 47 (or any other example embodiment in this disclosure) wherein the defect is located at least 10 nm from any interface of the semiconductor body.

49. The photon switch according to any of example enumerated embodiments 32 to 48 (or any other example embodiment in this disclosure) wherein the defect comprises an unpaired electron spin and the means for initializing the defect comprises one or more of electron paramagnetic resonance, electron spin resonance or nuclear magnetic resonance.

50. A switching network comprising a plurality of the photon switches according to any of example enumerated embodiments 32 to 49 (or any other example embodiment in this disclosure) wherein the plurality of switches are arranged in a tree structure such that the first and second output paths of some of the plurality of switches are optically coupled to inputs of other ones of the plurality of switches.

51. An information processing method comprising:
    receiving a first photon at a first switch, the first switch including a first region of semiconductor material, and a first local defect disposed in the first region of semiconductor material wherein the first local defect has a first defect computational state; and
    based on, at least, the first defect computational state of the first local defect, directing a second photon to travel by:
        a first output path communicatively coupled to the first local defect, or
        a second output path communicatively coupled to the first local defect.

52. The information processing method of example enumerated embodiment 51 (or any other example embodiment in this disclosure) wherein receiving the first photon comprises causing the first photon to travel by a first input path communicatively coupled to the first local defect.

53. The information processing method of example enumerated embodiment 52 (or any other example embodiment in this disclosure) wherein:
    the first photon has a first photon computational state; and
    based on, at least, the first defect computational state and the first photon computational state, directing the second photon to travel by the first output path, or the second output path.

54. The information processing method of example enumerated embodiment 52 (or any other example embodiment in this disclosure) further comprising:
    preparing the first photon with the first photon computational state selected from a first photon basis state, a second photon basis state, or a superposition of the first photon basis state and the second photon basis state.

55. The information processing method of example enumerated embodiment 51 (or any other example embodiment in this disclosure) further comprising:
    preparing the first local defect in the first defect computational state, wherein the first defect computational state is selected from a first defect basis state, a second defect basis state, and a superposition of the first defect basis state and the second defect basis state.

56. The method of any of example enumerated embodiments 51 to 55 (or any other example embodiment in this disclosure) further comprising:
    measuring a state for the second photon.

57. The method of any of example enumerated embodiments 51 to 56 (or any other example embodiment in this disclosure) further comprising:
    measuring a state for the first local defect.

58. The method of any of example enumerated embodiments 51 to 57 (or any other example embodiment in this disclosure) further comprising:
    receiving the second photon at a second switch including a second region of semiconductor material, and a second local defect disposed in the second region of semiconductor material wherein the second local defect has a second defect computational state; and
    based on, at least, the second defect computational state of the second local defect, directing a third photon to travel by:
        a third output path communicatively coupled to the second local defect, or
        a fourth output path communicatively coupled to the second local defect.

59. The method of any of example enumerated embodiments 51 to 58 (or any other example embodiment in this disclosure) wherein the first photon becomes the second photon.

60. An information processing method comprising:
    preparing a local defect disposed in a body of semiconductor material in a defect computational state, wherein the defect computational state is selected from a first defect basis state, a second defect basis state, and a superposition of the first defect basis state and the second defect basis state; and
    based on at least the defect computational state of the local defect,
    directing an output photon to travel by:
        a first output path communicatively coupled to the local defect, or
        a second output path communicatively coupled to the local defect.

61. The information processing method of example enumerated embodiment 60 (or any other example embodiment in this disclosure) further comprising: causing an input photon to travel by a first input path communicatively coupled to the local defect.

62. The information processing method of example enumerated embodiment 61 (or any other example embodiment in this disclosure) wherein:
    the input photon has an input photon computational state; and
    based on, at least, the defect computational state and the input photon computational state, directing the output photon to travel by the first output path, or the second output path.

63. The information processing method of example enumerated embodiment 61 or 62 (or any other example embodiment in this disclosure) comprising:

preparing the input photon with an input photon computational state selected from a first photon basis state, a second photon basis state, or a superposition of the first photon basis state and the second photon basis state.

64. The information processing method of example enumerated embodiment 60 (or any other example embodiment in this disclosure) further comprising:
preparing the output photon with a photon computational state selected from a first photon basis state, a second photon basis state, or a superposition of the first photon basis state and the second photon basis state;
causing the output photon to travel by a first input path communicatively coupled to the first defect; and
based on, at least, the defect computational state and the output photon computational state, directing the output photon to travel by the first output path, or the second output path.

65. The information processing method of any of example enumerated embodiments 60 to 64 (or any other example embodiment in this disclosure) further comprising:
measuring a state for the output photon.

66. The information processing method of any of example enumerated embodiments 60 to 65 (or any other example embodiment in this disclosure) further comprising:
measuring a state for the local defect.

67. Apparatus having any new and inventive feature, combination of features, or sub-combination of features as described herein.

68. Methods having any new and inventive steps, acts, combination of steps and/or acts or sub-combination of steps and/or acts as described herein.

In this specification and appended claims "a", "an", "one", or "another" applied to "embodiment", "example", or "implementation" is used in the sense that a particular referent feature, structure, or characteristic described in connection with the embodiment, example, or implementation is included in at least one embodiment, example, or implementation. Thus, phrases like "in one embodiment", "in an embodiment", or "another embodiment" are not necessarily all referring to the same embodiment. Furthermore, the particular features, structures, or characteristics may be combined in any suitable manner in one or more embodiments, examples, or implementations.

As used in this specification and the appended claims, the singular forms of articles, such as "a", "an", and "the", include plural referents unless the context mandates otherwise. It should also be noted that the term "or" is generally employed in its sense including "and/or" unless the context mandates otherwise.

Unless the context requires otherwise, throughout this specification and appended claims, the word "comprise" and variations thereof, such as, "comprises" and "comprising" are to be interpreted in an open, inclusive sense, that is, as "including, but not limited to".

All of the US patents, US patent application publications, US patent applications, foreign patents, foreign patent applications, and non-patent publications referred to in this specification, or referred to on any application data sheet, are incorporated by reference in their entireties for all purposes herein.

While certain features of the described embodiments and implementations have been described herein, many modifications, substitutions, changes and equivalents will now occur to those skilled in the art. It is, therefore, to be understood that the appended claims are intended to cover all such modifications and changes as fall within the scope of the described embodiments and implementations.

"herein", "above", "below", and words of similar import, when used to describe this specification, shall refer to this specification as a whole, and not to any particular portions of this specification;

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments" or "in some implementations". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodi-

What is claimed is:

1. A method for switching photons, the method comprising:
providing a network comprising a plurality of photon switches interconnected by a plurality of optical paths, each photon switch of the plurality of photon switches comprising a defect in a body of a semiconductor material and first and second distinct optical waveguides which respectively provide first and second output paths from the photon switch;
initializing the defect of each photon switch of the plurality of photon switches to a respective first computational state, the respective first computational state for the defect of each photon switch of the plurality of photon switches being selected from:
a first basis state in which the defect is optically coupled to one or more photon modes in the first optical waveguide of the photon switch;
a second basis state in which the defect is not optically coupled to the one or more photon modes in the first optical waveguide of the photon switch; and
a superposition of the first and second basis states;
delivering a first photon to a first one of the plurality of photon switches by a first one of the plurality of optical paths; and
based on the first computational state of the defect of the first one of the plurality of photon switches, selectively coupling the first photon to a second one of the plurality of photon switches by the first output path of the first one of the plurality of photon switches or to a third one of the plurality of photon switches by the second output path of the first one of the plurality of photon switches.

2. The method according to claim 1 wherein the first computational state comprises an electron spin state.

3. The method according to claim 1 wherein the first photon has a first optical frequency and, when the defect of the first photon switch is in the first computational state, the defect has an optical transition having an energy corresponding to the first optical frequency of the first photon.

4. The method according to claim 3 wherein the energy of the optical transition is a Zero Phonon Line (ZPL) transition energy.

5. The method according to claim 3 comprising delivering a first plurality of additional photons to the defect of the first photon switch by the first one of the optical paths, the first plurality of additional photons having optical frequencies different from the first optical frequency, wherein the method comprises outputting the first plurality of additional photons by the first optical waveguide.

6. The method according to claim 5 comprising delivering a second plurality of additional photons to the vicinity of the defect of the first photon switch by the first one of the optical paths, the second plurality of additional photons having the first optical frequency, wherein the method includes coupling the second plurality of additional photons to the second optical waveguide of the first photon switch by way of the defect of the first photon switch and outputting the second additional photons by the second optical waveguide of the first photon switch.

7. The method according to claim 1 further comprising, after a time interval following selectively initializing the defect of the first photon switch to the first computational state, setting the defect of the first photon switch to a second computational state different from the first computational state;
delivering a second photon to the defect of the first photon switch, the second photon having the first optical frequency; and
outputting the second photon from the first photon switch in the first optical waveguide of the first photon switch.

8. A method for switching photons, the method comprising:
providing a network comprising a plurality of photon switches interconnected by a plurality of optical paths, each photon switch of the plurality of photon switches comprising a defect in a body of a semiconductor material and first and second distinct optical waveguides which respectively provide first and second output paths from the photon switch;
initializing the defect of each photon switch of the plurality of photon switches to a respective first computational state, the respective first computational state for the defect of each photon switch of the plurality of photon switches being selected from:
a first basis state in which the defect is optically coupled to one or more photon modes in the first optical waveguide of the photon switch;
a second basis state in which the defect is not optically coupled to the one or more photon modes in the first optical waveguide of the photon switch; and
a superposition of the first and second basis states;
delivering a first photon to a first one of the plurality of photon switches by a first one of the plurality of optical paths; and
based on the first computational state of the defect of the first one of the plurality of photon switches, selectively coupling the first photon to a second one of the plurality of photon switches by the first output path of the first one of the plurality of photon switches or to a third one of the plurality of photon switches by the second output path of the first one of the plurality of photon switches;
the method further comprising delivering a stream of photons to the defect of the first photon switch and selectively directing photons of the stream of photons to be output by way of the first optical waveguide or the second optical waveguide by controlling the computational state of the defect of the first photon switch.

9. A method for switching photons, the method comprising:
providing a network comprising a plurality of photon switches interconnected by a plurality of optical paths, each photon switch of the plurality of photon switches comprising a defect in a body of a semiconductor material and first and second distinct optical waveguides which respectively provide first and second output paths from the photon switch;
initializing the defect of each photon switch of the plurality of photon switches to a respective first computational state, the respective first computational state for the defect of each photon switch of the plurality of photon switches being selected from:
a first basis state in which the defect is optically coupled to one or more photon modes in the first optical waveguide of the photon switch;
a second basis state in which the defect is not optically coupled to the one or more photon modes in the first optical waveguide of the photon switch; and
a superposition of the first and second basis states;

delivering a first photon to a first one of the plurality of photon switches by a first one of the plurality of optical paths; and based on the first computational state of the defect of the first one of the plurality of photon switches, selectively coupling the first photon to a second one of the plurality of photon switches by the first output path of the first one of the plurality of photon switches or to a third one of the plurality of photon switches by the second output path of the first one of the plurality of photon switches;

the method further comprising delivering a stream of photons to the defect of the first photon switch wherein a first subset of the photons of the stream of photons comprises the first photon and constitutes a signal and, by the defect of the first photon switch, selecting the signal and routing the signal to the second optical waveguide.

10. The method according to claim 1 wherein the first optical waveguide comprises an optical structure and the one or more photon modes are photon modes of the optical structure.

11. The method according to claim 10 wherein the optical structure comprises an optical cavity or an optical resonator.

12. The method according to claim 1 wherein for one or more of the plurality of photon switches the defect is one of a plurality of first defects of the same type and the method comprises selectively initializing each of the plurality of first defects to the first computational state.

13. A method for switching photons, the method comprising:

providing a network comprising a plurality of photon switches interconnected by a plurality of optical paths, each photon switch of the plurality of photon switches comprising a defect in a body of a semiconductor material and first and second distinct optical waveguides which respectively provide first and second output paths from the photon switch;

initializing the defect of each photon switch of the plurality of photon switches to a respective first computational state, the respective first computational state for the defect of each photon switch of the plurality of photon switches being selected from:
  a first basis state in which the defect is optically coupled to one or more photon modes in the first optical waveguide of the photon switch;
  a second basis state in which the defect is not optically coupled to the one or more photon modes in the first optical waveguide of the photon switch; and
  a superposition of the first and second basis states;

delivering a first photon to a first one of the plurality of photon switches by a first one of the plurality of optical paths; and based on the first computational state of the defect of the first one of the plurality of photon switches, selectively coupling the first photon to a second one of the plurality of photon switches by the first output path of the first one of the plurality of photon switches or to a third one of the plurality of photon switches by the second output path of the first one of the plurality of photon switches;

the method further comprising selectively initializing the defect of the third one of the plurality of photon switches to a third computational state;

delivering the first photon to the third one of the plurality of photon switches; and coupling the first photon into the second output path of the third one of the plurality of photon switches by way of the defect of the third one of the plurality of photon switches.

14. An information processing device comprising:
a body of semiconductor material;
a plurality of photon switches in the body of semiconductor material, the plurality of photon switches interconnected by a plurality of optical paths, each photon switch of the plurality of photon switches comprising:
  a defect supporting a computational state selected from:
    a first basis state,
    a second basis state, and
    a superposition of the first and second basis states;
  a first optical waveguide communicatively coupled to the defect and providing a first output path from the photon switch; and
  a second optical waveguide communicatively coupled to the defect and providing a second output path from the photon switch,
wherein:
  for each of the plurality of photon switches, the first optical waveguide and the second optical waveguide are distinct optical waveguides; and
  a first one of the plurality of photon switches is operable to receive a photon and, based on the computational state of the defect of the first one of the plurality of photon switches, selectively couple the photon to a second one of the plurality of photon switches via the first output path provided by the first optical waveguide or to a third one of the photon switches via the second output path provided by the second optical waveguide.

15. The information processing device of claim 14, wherein:
the photon has a photon computational state selected from:
  a first photon basis state,
  a second photon basis state, and
  a superposition of the first photon basis state and the second photon basis state, and
the photon is selectively coupled to the second one of the plurality of photon switches or the third one of the plurality of photon switches dependent on, at least, the computational state of the defect of the first one of the plurality of photon switches, and the photon computational state.

16. An information processing device comprising:
a body of semiconductor material;
a plurality of photon switches in the body of semiconductor material, the plurality of photon switches interconnected by a plurality of optical paths, each photon switch of the plurality of photon switches comprising:
  a defect supporting a computational state selected from:
    a first basis state,
    a second basis state, and
    a superposition of the first and second basis states;
  a first optical waveguide communicatively coupled to the defect and providing a first output path from the photon switch; and
  a second optical waveguide communicatively coupled to the defect and providing a second output path from the photon switch,
wherein:
  for each of the plurality of photon switches, the first optical waveguide a first one of the plurality of photon switches is operable to receive a photon and, based on the computational state of the defect of the first one of the plurality of photon switches, selectively couple the photon to a second one of the plurality of photon switches via the first output path provided by the first optical waveguide or to a third one of the photon switches via the second output path provided by the second optical waveguide;

the photon has a photon computational state selected from:
  a first photon basis state,
  a second photon basis state,
  a superposition of the first photon basis state and the second photon basis state, the photon is selectively coupled to the second one of the plurality of photon switches or the third one of the plurality of photon switches dependent on, at least, the computational state of the defect of the first one of the plurality of photon switches, and the photon computational state; and the photon interacts with the defect of the first one of the plurality of photon switches to selectively couple to the third one of the plurality of photon switches.

\* \* \* \* \*